US006951303B2

(12) United States Patent
Petersen et al.

(10) Patent No.: US 6,951,303 B2
(45) Date of Patent: Oct. 4, 2005

(54) COMBINATION ELECTRONIC AND PAPER BALLOT VOTING SYSTEM

(76) Inventors: Steven D. Petersen, 1527 W. Boise Pl., Chandler, AZ (US) 85224; Howard K. Jaecks, 1933 W. Main PMB 182, Mesa, AZ (US) 85201

( * ) Notice: Subject to any disclaimer, the term of this patent is extended or adjusted under 35 U.S.C. 154(b) by 0 days.

(21) Appl. No.: 10/392,111

(22) Filed: Jun. 27, 2003

(65) Prior Publication Data

US 2004/0169077 A1 Sep. 2, 2004

Related U.S. Application Data

(60) Provisional application No. 60/369,207, filed on Apr. 1, 2002.

(51) Int. Cl.[7] .................................... G06F 17/60

(52) U.S. Cl. ......................... 235/386; 235/52; 345/179; 707/3

(58) Field of Search .................. 235/386, 51; 345/179; 705/12; 707/3

(56) References Cited

U.S. PATENT DOCUMENTS

| | | | | |
|---|---|---|---|---|
| 3,944,788 A | * | 3/1976 | Comisar et al. | 235/54 F |
| 4,641,240 A | | 2/1987 | Boram | |
| 4,649,264 A | | 3/1987 | Carson | |
| 5,063,600 A | | 11/1991 | Norwood | |
| 5,218,528 A | | 6/1993 | Wise et al. | |
| 5,377,099 A | | 12/1994 | Miyagawa | |
| 5,497,318 A | | 3/1996 | Miyagawa | |
| 5,629,499 A | | 5/1997 | Flickinger et al. | |
| 5,635,726 A | | 6/1997 | Zavislan et al. | |

(Continued)

OTHER PUBLICATIONS

Douglas Holt, Machines New But Problem Familiar, Chicago Tribune, Mar. 21, 2002, Chicago IL. USA.

R.T. Mercuri, R. Mercuri's Statement on Electronic Voting, 2001, www.notablesoftware.com/RMstatement.html.

CALTECH–MIT Voting Tech Report, What is; What Could be, Jul. 01, pp. 3–9, 17–25, 32, 42–48, 58–64.

CALTECH–MIT Voting Tech Project Dec. 14, 2000 . . . Join Forces to Create Reliable, Uniform Voting System.

Performance and Test Standards for . . . Electronic Voting Systems, Federal Election Commision, PP. 18.

Paul Krugman, '04 Vote Must be Above Suspicion, Arizona Republic, Aug. 19, 2004.

Making Sure That Your Electronic Vote Will be Counted, Consumer Reports, Oct. 04, PP. 6.

Wendy M. Grossman, Ballot Breakdown, Scientific American.com, Jan. 19, 2004.

*Primary Examiner*—Daniel Stcyr
*Assistant Examiner*—Daniel A. Hess

(57) ABSTRACT

A Combination Electronic and Paper Ballot Voting System with electronic vote capture capability for automatically recording, tallying, and storing votes. Election headquarters computer software (50) combines voter data from precinct computers (71) and produces tallies. Precinct computers (71) use software (80) for vote data collection from electronic readers (61) that interface with precinct computers (71) via cables (35) through a system controller (72) that is a hub for connecting readers (61) with precinct computers (71). A voter places configured paper ballot (34) on reader (61) and marks choices on ballot (34) using a combination electronic and ink-marking stylus (62). An XY coordinate positioning device (89), inside reader (61) and underneath ballot placement area, electronically captures voter choices. Voter data are instantly transferred to precinct computers (71). Precinct computer software (80) tallies voter data, configures report and storage formats, and communicates results to headquarters computer (41). Permanently marked paper ballot (34) is retained as a definitive record of voter intent.

10 Claims, 23 Drawing Sheets

U.S. PATENT DOCUMENTS

| | | | | | |
|---|---|---|---|---|---|
| 5,732,222 | A | | 3/1998 | Miyagawa et al. | |
| 5,758,325 | A | | 5/1998 | Lohry et al. | |
| 6,050,490 | A | | 4/2000 | Leichner | |
| 6,081,793 | A | | 6/2000 | Challenger et al. | |
| 6,194,698 | B1 | | 2/2001 | Zavislan et al. | |
| 6,250,548 | B1 | | 6/2001 | McClure et al. | |
| 6,259,043 | B1 | | 7/2001 | Clary et al. | |
| 6,688,517 | B1 | * | 2/2004 | McClure et al. | 235/51 |
| 2001/0042005 | A1 | | 11/2001 | McClure et al. | |
| 2002/0007457 | A1 | | 1/2002 | Neff | |
| 2002/0075246 | A1 | * | 6/2002 | Zheltukhin | 345/179 |
| 2002/0169756 | A1 | * | 11/2002 | Biddulph | 707/3 |

* cited by examiner

FIG. 7a
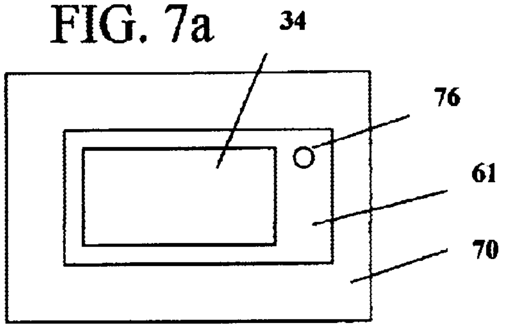
FIG. 7b
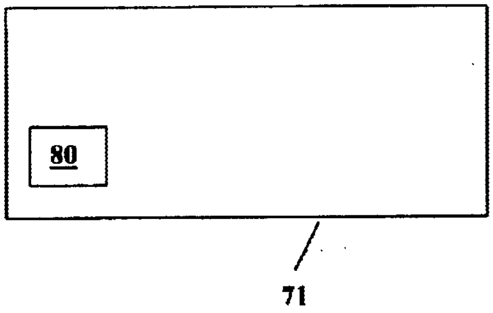
FIG. 7
68
| Voting Station Number | Occupied or Empty | Status | Reader Indicator Light Status |
|---|---|---|---|
| 1 | E | Ready | Flashing |
| 2 | O | Voting | ON |
| 3 | O | Error | Off |
| 4 | O | Help | ON |
| 5 | O | Double Vote | Flashing |

COMBINATION ELECTRONIC AND PAPER BALLOT VOTING SYSTEM

CROSS-REFERENCE TO RELATED APPLICATION

This application claims the benefit of Provisional Patent Application Ser. No. 60/369,207 filed 2002, Apr. 1.

BACKGROUND—FIELD OF THE INVENTION

This invention relates to voting systems, specifically to improved apparatus, systems, and processes for combining electronic and paper ballot voting.

COPYRIGHT NOTICE

A portion of the disclosure of this patent document contains material that is subject to copyright protection. The copyright owners have no objection to the facsimile reproduction by anyone of the patent document or the patent disclosure as it appears in the U.S. Patent and Trademark Office patent file or records, but otherwise reserves all copyrights whatsoever.

BACKGROUND—DESCRIPTION OF PRIOR ART

Government officials are concerned about the credibility of elections and want assurance that voting systems are designed to count every vote properly. And, they want the least expensive method that will meet these concerns. Legislatures and other government officials are scrambling to find affordable replacements for outmoded, and costly voting systems such as controversial punch-card voting machines, costly optical reader systems, and other voting methods currently in use. The following is a description and the disadvantages of these various known methods of voting.

Electronic Voting Systems

Several known voting methods include electronic systems, and most require redundant sorting of data and manual control resulting in the probability of significant operator error. Some electronic systems are unable to accommodate differing ballot styles even within the same precinct. Others allow the system to be disabled so input of further data cannot be done. Some provide no protection if incorrect data is initially entered.

Some electronic systems include voting tablets with printed ballot overlays placed on top of a voting tablet by a voter, with overlays used as a means for associating a candidate or ballot choice with a corresponding switch on a voting machine. A voter actuates switches to make a selection, and no actual written record of voter intent is created.

U.S. Pat. No. 4,641,240 to Boram 1987 Feb. 3, discloses a voting machine that uses a single paper ballot as an overlay template in conjunction with switches that are beneath the ballot and are pushed by a voter to indicate choice. This system uses memory modules created by a computer at a voting site at the same time a system printer creates a personalized ballot for each voter. The voter uses a paper ballot and the memory module at a voting station to make election choices. Boram U.S. Pat. No. 4,641,240 relies on various hardware devices during the voting phase of an election in order for voting to proceed. The requirement for multiple devices result in a system prone to break downs and interruption of voting activity when the computer creating the ballot formats fails, or when memory modules fail, or when printers fail.

Also, the system relies on a voter to handle the memory modules, insert them into a voting machine and remove them. Confusion in the use and function of the various devices would create delays in the voting process, thus frustrating voters. Boram U.S. Pat. No. 4,641,240 requires vote data be held in memory modules, therefore a voter cannot be certain that data in the memory module accurately reflects voting choices. Although paper ballots are used, they are not marked; therefore, no ballot is available for auditing should questions arise as to vote count authenticity.

Direct Recording Electronic voting systems typically provide no paper trail for backup and audit purposes.

U. S. Pat. No. 6,250,548 to McClure, et al., 2001 Jun. 26; U.S. Pat. Application No. 20010042005 to McClure, et al. 2001 Nov. 15; and, U.S. Pat. No. 5,377,099 to Miyagawa; 1994 Dec. 27; disclose voting systems that use only an electronic representation of a ballot. They do not make available a marked paper ballot to indicate ultimate voter intent when there is a question about the integrity of an election. Any system that relies on software and computer processing as the exclusive method of vote recording provides no method to check results of the electronic vote gathering against the actual marks or choices made by a voter. Actual marks are nonexistent. So no paper ballots are provided for challenged election which compromises audit possibilities. U.S. Pat. No. 4,649,264 to Carson 1987 Mar. 10, discloses a computer system requiring a button be pushed to vote that does not mark the ballot itself, so no record of voter intent is provided.

Some systems such as disclosed in U.S. Pat. No. 5,063,600 to Norwood 1991 Nov. 5, and U.S. Pat. Application No. 20020007457 from C. Andrew Neff 2002 Jan. 17 do not provide a marked paper ballot and do not provide an electronic image of a ballot. Lack of a paper trail because paper ballots are not marked by a voter and lack of an electronic image removes any possibility of an audit to confirm that electronic election data match true voter intent.

Other systems U.S. Pat. No. 6,194,698 to Zavislan, et al., 2001 Feb. 27, that do require a voter to mark a paper ballot require a secondary process to read votes into a machine for tallying. This additional handling and processing of ballots increases both the chance for error and the possibility of ballot tampering.

In U.S. Pat. No. 6,259,043 to Clary, et al., 2001 Jul. 10, an electronic system is disclosed that is a device for real time digitization and recognition of handwritten text that integrates digital recordation of handwritten text with paper-based record making systems. The device records handwritten strokes made with a stylus on a writing medium in proximity to a digitizing surface. The electronic ballot image of the system requires that a person review the image to discern voter intent and to properly count a write-in vote. Errors in recognition and conversion in important data gathering such as voting cannot be tolerated. Clary et al. discloses a writing medium that is not substantially configured to operate in association with its digitizing system thus allowing for the possibility that fraudulent ballots could be substituted for real ones.

U.S. Pat. No. 6,250,548 to McClure, et al., 2001 Jun. 26, discloses a complex, electronic system utilizing mechanical devices; a system requiring complicated set-up and take-down and that is difficult to store. McClure, et al. discloses a system that utilizes a standard networking technique of daisy-chain of units and a nonvolatile memory, such as used in various portable electronic devices. If one device in the chain fails there is a possibility that all devices further down the daisy chain will fail or at least lose their communication path to a system computer. A voting system using only an electronic representation of a ballot, such as disclosed in McClure, et al. U.S. Pat. No. 6,250,548 does not make available a marked paper ballot to indicate ultimate voter intent.

McClure et al. further discloses use of a mechanical switch matrix. Mechanical devices of this type require substantial system maintenance, and consist of components that require frequent replacement, particularly in heavily used areas. McClure et al. further discloses a system with mechanical devices prone to malfunctions that are difficult to detect during an election. When a particular switch stops working properly, the vote may not be counted for that choice. The malfunction appears as an under-vote that is typically accepted by election officials as the voter choosing not to vote in that race. It is likely the failure would not be recognized until the next system test, thus the election data from this device would be inaccurate. McClure et al. further discloses use of a bar code reader to determine the style of a ballot on a vote reader. Bar codes can be designed to conceal information and require additional bar code reading equipment, adding to the cost of a system. Bar code readers are prone to malfunctions since they depend on a clean and unwrinkled bar code surface in order for bar code to be properly read. Using any optical or mechanical device such as a bar code reader to identify ballot types is unreliable and costly.

U.S. Pat. No. 6,050,490 to Leichner 2000 Apr. 18, and U.S. Pat. No. 5,629,499 to Flickinger et al., 1997 May 13, disclose a handheld writing device and related data entry system that allow data entry tasks to be performed on a portable electronic clipboard device. Each device uses a digitizer and pen to record data in ink and electronically in a device memory, and each system stores data in internal memory until the device can be coupled to a computer whereby the data can be transferred to the computer for processing. Neither system provides for real-time data transfer to a processing computer for tasks such as vote tallying, therefore data stored in each device is at risk of being lost should a malfunction of the device occur. Such systems are comprised of devices that require data to be transferred to a system computer individually, thus increasing the amount of time required to tally vote data, and providing for network-type connections of several devices for multiple station data entry. Neither system makes election results available until all reporting jurisdictions have transferred their data to election headquarters.

Flickinger et al. U.S. Pat. No. 5,629,499 discloses a manual switch to allow the system to distinguish between different forms being used with the device, a method that allows data to be lost or incorrectly stored if a user enters information on a form before moving the switch to choose the correct form.

Wise et al., U.S. Pat. No. 5,218,528, discloses a computer-based voting system whereby a voter uses a graphic display to read a ballot and a computer is required at every voting station. The cost of a complex graphic display system is high, and voters unaccustomed to using computers may suffer from computer anxiety or be confused about how to use such a system.

U.S. Pat. No. 6,081,793 to Challener, et al., 2000 Jun. 27, discloses a system for security of election results and authentication of voter identification in part via a data processing system which utilizes a smart card and allows removal of ineligible or challenged votes. Some of the disadvantages of this disclosure are that a smart card has potential for abuse in that voter identification data can be stored on the card without the knowledge of a voter and there is no separation of voter registration and voting data. Further, special equipment must be utilized to read a smart card, thus a voter has no way of checking exactly what is on the card. Systems such as this raise the possibility that a voting system could potentially link a voter to the choices made during voting, thus compromising the anonymity of a voter.

U.S. Pat. No. 5,497,318, to Miyagawa 1996 Mar. 5, discloses an election terminal apparatus which uses handwriting recognition. U.S. Pat. No. 5,732,222 to Miyagawa, et al., 1998 Mar. 24, discloses an election terminal apparatus and an electronic system used for voting and totaling votes cast in an election that requires an integral-type display and tablet unit for input data and an optical character recognition capability for write-in voting. As with any system that utilizes handwriting recognition, the likelihood of recognition and conversion error is too great to be acceptable for important data such as write-in votes.

U.S. Pat. No. 5,218,528 to Wise et al., 1993 Jun. 8, discloses a feature that requires a voter to indicate the desire to enter a write-in vote. The voter must then be provided a printed write-in ballot for the particular race for which the write-in vote is to be entered. A system printer must be operational, and if each voting station is not equipped with a printer, a voter must wait for the special ballot to be printed causing confusion and delays in the voting process, especially when a large numbers of voters wish to cast write-in votes.

Memory Modules and Optical Disks

There are several electronic voting systems either in use or proposed. One such system is a memory module arrangement that requires a form of movable or transported memory and internal batteries to maintain stored voting results. The battery technique can result in loss of data if batteries lose their charge. In normal use, batteries must be recharged, adding complexity to the circuitry, or replaced regularly, which is costly. Systems that depend on optical disks or similar media being transported between locations to transfer election data suffer from the possibility that disks will be sent to the wrong location, thus causing delays while the problem is corrected. Also, systems that rely on single paths of data transfer, such as a disk moved from place to place, are susceptible to fraud and tampering by saboteurs replacing the media with fraudulent media.

U.S. Pat. No. 5,758,325 to Lohry, et al., 1998 May 26, discloses an electronic voting system that automatically returns to proper operating state after power outage, and includes a central judges station having a detachable flash memory cartridge for use in storing election data that is networked to a plurality of voting booths. The contents of a cartridge are shadowed by identical storage in a separate flash memory module. This disclosure requires shadow storage and voting results are affected by power failures.

Systems that depend on optical disks, or similar media, being transported between locations to transfer election data by hand, such as disclosed in McClure, et al., U.S. Pat. No. 6,250,548 suffer from the possibility of the disks being sent to the wrong location which can result in vote tally delays and the potential for lost memory devices. Also, systems that rely on single paths of data transfer, such as a disk moved from place to place, are susceptible to fraud and tampering by saboteurs replacing the media with fraudulent media.

McClure et al. U.S. Pat. No. 6,250,548 discloses a memory device that stores data magnetically. Magnetic storage of data can be unintentionally or intentionally corrupted by having the storage medium in close proximity to a magnetic field such as a computer monitor or a television. And, magnetic medium has a relatively short storage life.

Some systems require two-memory modules to complete a voting process. There is considerable potential for error with two-memory systems, including incorrect configuration for some precincts. Also, there is the potential for security breaches with this system, as, at some point in the process, a legitimate memory module could be replaced with a fraudulent memory module.

Electronic Systems Using Electronic Displays

Some electronic systems require a video display screen that looks like a computer monitor. Voters must scroll through options before making voting decisions, a process that can intimidate, confuse, and frustrate voters causing incorrect or incomplete ballots, due to such computer-use anxiety. Some voters simply could not or would not use these devices. The cost of a video display screen at each voting station makes these systems cost prohibitive.

U.S. Pat. No. 4,649,264 to Carson 1987 Mar. 10, discloses a portable voting machine that contains a paper ballot within the machine and scrolls the paper to reveal all or part of the ballot to a voter. A voter pushes a button corresponding to a candidate or choice on a ballot. The ballot itself is not marked, so no record of voter intent is provided. Due to the mechanical nature of the scrolling mechanism required to position a ballot, there are many moving parts that would require intense maintenance and would be prone to breakdowns.

U.S. Pat. No. 5,063,600 to Norwood 1991 Nov. 5, discloses a computer system utilizing a clear digitizing tablet placed over a display screen with an attached pen for computerizing hand written and keyboard entered data. One use for this system could be electronic voting, but the system does not utilize any type of paper form for data entry, so no paper ballot would be provided for audit purposes, nor does the system provide an electronic image of a ballot. To use this system for electronic voting, each voting station would need to be equipped with a full function pen based computer. This would make the system cost prohibitive for use as a voting system.

There are several types of Liquid Crystal Display (LCD)-based systems all of which require touch screens. U.S. Pat. Application No. 20010042005 to McClure, et al. 2001 Nov. 15, discloses an electronic only voting apparatus that relies on a Liquid Crystal Display to provide ballot information to a voter. This apparatus requires a voter to navigate the ballot using a rotary wheel and enter votes by pressing an appropriate key, an apparatus that would be difficult to use therefore prone to voter anxiety and voter error.

Some Liquid Crystal Display (LCD) systems require a stylus to mark votes on a video display screen, a system that can be intimidating to some voters not accustomed to using computers. These devices can also suffer from problems relating to inadvertent pressure being applied to the screen such as the voters' hand resting on the screen. LCD systems fail to provide a record of voter intent by eliminating the paper ballot.

U.S. Pat. No. 5,377,099 to Miyagawa, 1994 Dec. 27, discloses an apparatus that includes a storage unit, coordinate input unit and two-dimensional display unit which is a Liquid Crystal Device, a stylus, and a transparent tablet. Liquid crystal devices require careful handling; are costly; are sensitive to storage conditions, such as dirt and temperature variation; and can be difficult to read due to dim screens or bright ambient light, and are intimidating to some voters.

Miyagawa U.S. Pat. No. 5,377,099 performs confirming operations and registration of a vote count in a storage unit or causes another unit connected to the storage unit by wire or radio to perform registration.

An Automatic Teller Machine-style device is a touch screen system required by some voting systems. A problem with such devices is degradation of the sensitivity of the touch screen from dirt and dust and from repeated use. Another problem with a system that relies on pressure or touch, rather than an electronic signal, is that an inadvertent touch such as pressure from a voter resting a hand on the screen will be read and will result in a misreading vote. Also, touch screen systems fail to provide a record of voter intent by eliminating the paper ballot, and, computer-use anxiety associated with such devices is high.

Optical Readers

Optical Readers are electronic devices used to tally, or to collect and tally, paper ballot votes. U.S. Pat. No. 6,194,698 to Zavislan, et al., 2001 Feb. 27, and U.S. Pat. No. 5,635,726 to Zavislan, et al., 1997 Jun. 3, disclose electro-optical sensor circuitry suitable for use as an optical detection system for electronic voting apparatus. U.S. Pat. No. 6,194,698 discloses a sensor circuit with an array of a plurality of optical signal responsive photodetectors; an amplifier stage, which is a transimpedance stage; and a feedback circuit. The system uses polarized light transmitted from sources of illumination, such as Light Emitting Diodes (LEDs), and is received at the photodetectors via cross-polarizers. Such systems, which require a voter to use an ink pen for checking boxes, connecting lines, or other techniques, can result in questioned or uncounted ballots due to improper marking. Smudges or dirt on a ballot corrupts the scanning process creating a high possibility for error. The quality of the ink mark is important. An optical reader may miss light or inconsistent marks made by a voter. Optical readers are cumbersome to transport to election sites and to store between elections and are sensitive to dirt and dust accumulation on the optical areas. Also, completed paper ballots must go through a secondary process of being fed through the scanning apparatus, requiring extra time and handling to process the ballots.

Internet

A recent voting method is via the Internet. Millions of voters do not have access to the Internet. Internet voting is mistrusted by many voters because of issues with voter identification, multiple voting, possible outside influences in vote tallying, and other problems. Serious security and privacy risks must be addressed and solved before the Internet can become a viable voting method. The use of a paper ballot in combination with the Internet is not possible, so no paper ballot is available as a backup audit trail for election officials if ever needed.

U.S. Pat. Application No. 20020007457 from C. Andrew Neff 2002 Jan. 17, discloses an Internet-related vote data encryption scheme with associated hardware. Sophisticated computer hackers breaking encryption codes would cause results to be questioned. Even if a hacker could not break the encryption code itself, merely gaining access to the system would result in doubt regarding the security of the voting process. Computer hackers have the ability to enter any Internet portal, and election information is tempting to hackers due to the high profile of elections. Lack of a paper trail, when paper ballots are not marked by a voter, removes any possibility of an audit to confirm that electronic election data match true voter intent when voting occurs over the Internet.

Mechanical Voting Devices

Mechanical devices, such as those that include machines with mechanical switches and levers actuated by a voter to trigger a mechanical counter, are used in many election systems. Such machines have many mechanical parts that require maintenance and repair, are subject to mechanical malfunctions, are expensive, and are heavy to move and set up.

Other mechanical devices in use include machine-readable systems, such as those requiring punch cards. Such systems are prone to multiple problems including improperly punched ballots that cannot be read by the machine and must be discarded, illegible ballots which must be discarded, votes inadvertently cast for unintended candidates, and ballots that have been punched more than once in a given race causing a machine to incorrectly tally votes.

Paper-ballot Voting

Marking voting choices or writing in choices on a paper ballot is a voting method used throughout the world. Drawbacks to voting methods relying solely on paper ballots are the length of time required to tally votes and the likelihood that human error will occur in the tallying process. Most manual vote counting processes require that at least two people view each ballot to confirm the count. Thus, tallying paper ballots by manual counting is an inefficient method of counting votes. This method has survived for so long, in part, because paper ballots are considered the ultimate indication of voter intent.

The viability of paper ballots marked by the voter is clear, but only when paper ballots are used in combination with an electronic vote gathering system with instantaneous tallying capabilities does the use of paper ballots remain practical for modem elections. Some systems that do require a voter to mark a paper ballot require a secondary process to read votes into a machine for tallying. This additional handling and processing of ballots increase both the chance for error and the possibility of ballot tampering. The counting of paper ballots should be necessary only in the event of a challenged election, or as a means for auditing the electronic vote tally results.

Disadvantages of Prior Art

Prior art does not provide a combination electronic and paper ballot voting system that allows voters to mark paper ballots as if no electronics were a part of the system as described in the present invention. Prior art does not provide electronics allowing instant, accurate vote tallies, with a dedicated operating system that provides a very high level of election security as described in the present invention. Prior art does not provide electronic voting systems with a requirement for retention of a paper ballot if needed for audit purposes as described in the present invention. Prior art does not provide a vote capturing device that is lightweight, easy-to-transport, easy to store, and inexpensive, as described in the present invention Thus, heretofore known methods and devices for voting suffer from a number of disadvantages as set forth along with reasons the present invention is superior.

(a) Existing computer systems with complex components required at each voting station such as a system with a full function pen-based computer that utilizes a clear digitizing tablet placed over a display screen with an attached pen for computerizing hand written and keyboard entered data, are difficult to set up, use, and store, and cost prohibitive for use as a voting system. The present invention provides for a Combination Electronic and Paper Ballot Voting System designed without complex components and requires only one computer for an entire precinct of voting stations.

(b) Existing voting systems utilizing electronic ballot images and character recognition software as a method of capturing write-in votes produce an unacceptable margin of error in character recognition of handwritten text, and subsequent conversion to typeface characters. The present invention does not use character recognition software as a means of capturing write-in votes.

(c) Existing voting systems that utilize a writing medium that is not substantially configured to operate in association with its digitizing system can allow fraudulent ballots to be substituted for real ones. The present invention does not allow fraudulent ballots as marks made on the paper ballot where they are not allowed trigger an error message alerting election officials of a potential problem.

(d) Existing voting systems with no mechanism for immediately notifying precinct officials of over-votes or other mistakes allow vote tallies that do not reflect the intent of some voters. The present invention does not allow mistakes to be unnoticed by election officials.

(e) Existing voting systems that utilize a standard networking technique of daisy-chain of units and a nonvolatile memory allow for the possibility that all devices further down the daisy chain will fail, or at least lose their communication path to a system computer, if one device in the chain fails. In the present invention, a daisy chain is not required.

(f) Existing voting systems that require memories to be transported back and forth from a precinct to a main election office by hand can result in vote tally delays and the potential for lost or damaged memory devices. The present invention relies on portable memory devices as a redundant data storage device and for long-term data storage.

(g) Several existing voting systems use only an electronic representations of ballots and do not utilize any type of paper form for data entry, so no paper ballot is provided to indicate ultimate voter intent for audit purposes when there is a question about the integrity of an election. The present invention is not an electronic-only system, rather requires and retains a paper ballot as a redundancy to its electronic ballot image.

(h) A voting system with many mechanical parts, such as a mechanical switch matrix, requires substantial system maintenance and frequent replacement of components. The present invention has very few mechanical parts.

(i) A voting system with mechanical devices is prone to malfunctions that are difficult to detect during an election, thus election data from such devices would be inaccurate. The present invention has very few mechanical parts and is therefore less prone to malfunctions.

(j) A voting system using any optical or mechanical device, such as a bar code reader, to identify ballot types is unreliable and costly. The present invention does not require reading of bar codes, thus is reliable and eliminates the need for additional costly equipment.

(k) Existing voting systems utilizing Liquid Crystal Display technology requiring touch screens that can be difficult to read, due to dim screens or bright ambient light, require special handling and storage due to the fragile nature of an LCD apparatus including sensitivity to dirt and temperature variations while in storage. The present invention does not require LCD technology and equipment that is sensitive to storage conditions or will be difficult to use in varying ambient lighting.

(l) Optical scanning systems rely on the quality of the mark on a ballot for accurate counting. Ink smudges can cause a scanner to read a vote when none was intended, or a light or uneven ink mark made by the voter may not be detected by the scanning device, thus causing an intended vote to be disregarded. The present invention does not require optical scanning devices and problems are detected immediately and election officials are notified so corrective action can be taken.

(m) Optical scanning systems require a secondary operation to tally votes by feeding all ballots through a scanner. This requires additional time for data processing, thus delaying final election results. The present invention automatically tallies votes without a secondary operation such as a scanner.

(n) An existing system utilizing a smart card for security of election results and authentication of voter identification, which allows removal of ineligible or challenged votes, has potential for abuse in that voter identification data can be stored on the card without the knowledge of a voter, and, there is no separation of voter registration and voting data. The present invention does not require a smart card and does not allow voter identification data to be stored, so does not allow removal of votes.

(o) An existing system utilizing a smart card requires special equipment be utilized to read a smart card, thus a voter has no way of checking exactly what is on the card. Such systems can potentially link a voter to the choices made during voting, thus compromising the anonymity of the voter. The present invention does not store voter identification and does not require a smart card or smart card reading equipment.

(p) Existing devices, such as those that store data in an internal memory until the device can be coupled to a computer for data transfer, risk loss of data should a malfunction of the device occur. The present invention does not require storing data until a device is coupled to a computer.

(q) Existing systems that require data to be transferred to a system computer individually, without the benefits of a networked connection, slow the data transfer process when multiple voting stations are in use, increasing the amount of time required to tally vote data. The present invention does not require a time-consuming individual transfer of data.

(r) Existing systems rely on transported portable memory devices to arrive at a central location before tallying can commence. The present invention does not require portable memory devices be transported before tallying can begin.

(s) An existing system requires a switch be moved to distinguish between different ballot forms being used. If a user enters information on a form before moving the switch to choose the correct ballot form, data may be lost or incorrectly stored. The present invention does not require a voter to move a switch, so improper use of a switch cannot result in lost data or incorrectly stored data.

(t) An existing system requires contents of a cartridge to be shadowed for identical storage in a separate flash memory module to return to proper operating state after a power outage. The use of multiple memory modules leads to confusion for election workers and may lead to system failure if a module is lost, misplaced, or damaged. The present invention does not require flash memory modules.

(u) An existing system requires a central judges station with a detachable flash memory cartridge for use in storing election data that are networked to a plurality of voting booths. The present invention does not require detachable flash memory cartridges.

(v) Existing systems for write-in voting allows the possibility for recognition and conversion errors that is too great to be acceptable for important data such as write-in votes. The present invention does not use handwriting recognition techniques that may not produce acceptable recognition results for write-in votes.

(w) Existing systems requiring integral-type displays and tablet units for input data that utilize handwriting recognition are subject to recognition and conversion error. The present invention does not require an integral-type display and tablet unit for input data and does not use character recognition for write-in voting.

(x) An existing computer-based voting system requires a voter to use a graphic display to read a ballot, a system that requires a computer at every voting station. Voters unaccustomed to using computers may suffer from computer anxiety or be confused about how to use the system, and the cost of complex graphic display systems is high. The present invention is less costly as it does not require a computer at each voting station and the electronics of the present invention are not visible to a voter so do not intimidate or confuse voters.

(y) An existing system includes a feature that requires a system printer, as a voter must be provided a printed write-in ballot when the voter indicates a desire to enter a write-in vote. If each voting station is not equipped with a printer, a voter must wait for the special ballot to be printed causing confusion and delays. The present invention does not require a printer at each voting station, so write-in votes do not slow the voting process.

(z) Existing systems require transporting of vote tallies by hand from precincts to election headquarters making vote tallies subject to delays or loss. The present invention does not require hand carrying of vote tallies.

(aa) Existing systems that rely on various hardware devices such as switches beneath a ballot template, or a portable voting machine that includes a scrolling mechanism to position a ballot, a button that must be pushed to vote for a race, and many other moving parts require intense maintenance and are prone to breakdowns. The present invention does not require multiple devices and various moving parts susceptible to breakdowns.

(bb) An existing system requires memory modules to be created by a computer at a voting site at the same time a system printer creates a personalized ballot for each voter, and then voters must handle memory modules. Such a system would create delays when voting is interrupted when the computer creating the ballot formats, or the memory modules, or the printer fails, and when voters unaccustomed to computer use become confused and frustrated. The present invention does not require personalized ballots and voters do not handle memory modules.

(cc) An existing Internet-related vote data encryption scheme, with associated hardware lacks security as results of an election could be altered if computer hackers broke the encryption codes. The present invention is not accessible from the outside; there is no threat of hackers disrupting the voting process.

(dd) Existing systems requiring electronic optical readers have mechanical parts that can be jammed by ballot imperfections, creases, or bends, cannot determine voter intent when a voter marks more than one location for one ballot item, and misread smudged ballots. The present invention does not require optical readers that are prone to mechanical difficulties and inaccuracies in vote tallying.

(cc) Existing systems that use paper ballots do not allow instant recognition of voter error, such as inadvertent or double votes, that allows recording of votes that might be challenged. The present invention recognizes voter error instantaneously.

(ff) Existing systems are mechanical with numerous moving parts, such as those requiring scrolling of paper ballots and pushing of buttons or manipulating switches in order to vote, therefore require extensive maintenance and are prone to frequent breakdowns.

(gg) Existing systems utilize portable electronic storage media, such as optical disks, as the sole method of data transfer between an election headquarters and precincts, lack redundancy and security. Deliveries can be untimely or can be made to incorrect locations, and incorrect disks may be delivered. The present invention is not limited to one method of data transfer.

Prior art does not provide a combination electronic and paper ballot voting system of apparatus, systems, and processes that instantaneously tallies votes without the need for secondary processing of marked ballots. Prior art does not provide a voting system that maintains the security and familiarity of a paper ballot yet allows instantaneous vote tallies necessary for modem election needs.

SUMMARY OF THE INVENTION

In accordance with the present invention a voting system comprises a traditional paper ballot combined with an electronic vote-capture capability that records, instantaneously tallies and stores votes; a voting system having an electronic reader using an XY coordinate positioning device to record marks on a paper ballot made by an electronic and ink stylus, through a reader control unit, and a system control apparatus to a computer at a precinct, with software configured to report voter data to a computer at an election headquarters.

In accordance with the present invention a voting system comprises a Combination Electronic and Paper Ballot Voting System and process designed to capture and store votes instantaneously in a computer and retain marked paper ballots. Further, the present invention comprises an electromechanical pen with ink marking capability, an electronic ballot reader with a data input device, that is an XY coordinate positioning device, that captures the location of marks made on a paper ballot; custom application software that correlates the marks made by a voter on the paper ballot to candidates or choices on the ballot, and counts votes accordingly, thus creating a paper record as well as an electronic record of election vote data. Further, the present invention comprises a host computer that communicates with electronic readers, through a system control apparatus, and processes and stores vote tally data. Further, the present invention comprises a system designed so that a voter will not notice the voting process is different from a paper-ballot-only method, thus eliminating computer anxiety.

Objects and Advantages

Accordingly, besides the objects and advantages of the Combination Electronic and Paper Ballot Voting System described in the foregoing, several objects and advantages of the present invention are:

(a) to provide a voting system utilizing a combination paper and electronic voting system designed with uncomplicated components that are easy to store, therefore easy for election officials to use;

(b) to provide a voting system that accommodates write-in votes by recording handwritten text and electronically storing the characters without conversion to type-faced characters in the system software, with handwritten text stored electronically for review by an election official for determination of voter intent on write-in votes, and the paper ballot with handwritten text of voter remaining as the ultimate record of voter intent;

(c) to provide a voting system with a writing medium, which is a paper ballot specifically configured to operate in association with the digitizing system so that marks made on the paper ballot where they are not allowed will trigger an error message alerting election officials of a potential problem;

(d) to provide a voting system that notifies election officials immediately if a voter over-votes or makes a mistake in using the system;

(e) to provide a voting system that uses a system control apparatus, instead of a daisy-chain, so that if any unit fails the operation or communication of other units in the system cannot be disrupted;

(f) to provide a voting system that utilizes portable memory devices as redundant storage devices for checks against transmitted data and for long-term data storage only;

(g) to provide a voting system that, in addition to utilizing electronics that are not visible to a voter to create an electronic ballot image, utilizes a tangible paper ballot that is easy to read, easy to navigate and familiar, therefore not intimidating to voters, with a vote tally redundancy and audit trial built into the system, through the additional requirement that paper ballots be retained as the ultimate record of voter intent;

(h) to provide a voting system with very few moving mechanical parts so that maintenance and replacement of components is minimized and the life of the components is extended;

(i) to provide a voting system that can quickly and automatically recognize failure of any component of the system during an election and immediately notify election officials of the failure, unlike systems utilizing mechanical switches prone to malfunctions that are difficult to recognize;

(j) to provide a voting system simply designed with a non-optical electronic reader, a system that is less costly and less prone to malfunctioning than complex systems such as those utilizing bar code reading;

(k) to provide a voting system with electronics and equipment that is simply designed, much less fragile, easy and non-intimidating to use, requires no special handling or special storage, resulting in a much less costly system than other electronic technologies such as Liquid Crystal Display systems;

(l) to provide a voting system that instantaneously captures, tallies, and stores votes that is a much more accurate, less expensive, and faster system than systems such as those requiring optical scanning equipment for vote tallying;

(m) to provide a voting system that automatically monitors voting station activity and instantly alerts election officials of double votes, inactivity in a station where a voter is voting, or any system problem, so corrective action can be taken immediately, resulting in more efficient elections, faster voter turnaround and few spoiled ballots;

(n) to provide a voting system that maintains separation between voter registration and voting data, therefore is secure from abuse that can arise from voter identification data leading to removal of votes, a possibility with smart card systems on which voter identification data are stored;

(o) to provide a voting system that does not link a voter to a voter choice thus maintaining anonymity of a voter;

(p) to provide a voting system that provides for real-time data transfer and redundant storage of voting choices, precluding the risk of lost votes;

(q) to provide a voting system that includes networking capability so that several data entry systems can be connected to a single controlling computer, with a controlling computer accepting data from individual voting stations, at various times, while stations are in use, so that a time-consuming individual transfer of data is not required;

(r) to provide a voting system that utilizes network-type connections that precinct computer data are instantaneously transferred, allowing faster consolidation of precinct results.

(s) to provide a voting system that allows the use of multiple ballot styles within a precinct, that utilizes electronics that distinguish between different ballot formats at a precinct computer, so that data are not lost or incorrectly stored through improper use of a switch or other mechanical device required to distinguish between ballot formats;

(t) to provide a voting system that utilizes rechargeable batteries built into the system which automatically switch on to provide back up power, therefore are unaffected by power failures;

(u) to provide a voting system that is designed with built-in nonvolatile memory, a permanent storage that, unlike detachable flash memory cartridges, will not be misplaced or compromised;

(v) to provide a voting system that replicates handwriting so there can be no character recognition errors from human interpretation of handwritten text;

(w) to provide a voting system that recognizes that a write-in vote is in process and electronically duplicates and saves the written text, as well as maintaining the paper ballot with the original voter marks, a less costly and faster method of accommodating write-in votes than utilizing integral type display and table units for data input;

(x) to provide a voting system of simple design that does not require computers at every voting station, so is much less expensive than complex graphic display systems, and, utilizes electronic circuitry not visible to voters, so does not intimidate voters;

(y) to provide a voting system that allows write-in votes on the paper ballot, so there is no confusion or delay for writing in a vote, as there is no waiting for a special ballot to be printed and no costly requirement for a printer at each voting station;

(z) to provide a system that makes available several methods of transmission of vote tallies from precincts to election headquarters, including modems, faxing of paper reports, electronic transfer of portable memory device, or an Internet connection, in order to preclude delay or loss of vote tallies caused from transporting by hand;

(aa) to provide a voting system of simple design without complex components and moving parts such as scrolling mechanisms or switches, so that the present invention is not susceptible to failures and breakdowns that can occur when multiple devices are required;

(bb) to provide a voting system of simple design that does not require voters to handle memory modules and does not require creation of personalized ballots for each voter, the result is that the present invention is easy to use and provides for an unimpeded voting process;

(cc) to provide a voting system with built-in redundancies of vote tallies, a system that is extremely secure, unlike Internet voting systems with data encryption schemes susceptible to tampering by computer hackers;

(dd) to provide a voting system designed with the capability to instantly tally votes, an extremely accurate system that does not require optical readers or other such devices that are prone to mechanical difficulties and inaccuracies in vote tallying;

(ee) to provide a voting system with the capability of instantly recognizing voter error, such as inadvertent or double votes, so does not allow recording of votes that might be challenged, such as inadvertent or double votes;

(ff) to provide a voting system utilizing vote capture electronics of simple design with sturdy components, a system less costly because it requires less maintenance and is much less likely to breakdown than mechanical systems with numerous moving parts, such as those requiring scrolling of paper ballots, pushing of buttons, or switches in order to vote;

(gg) to provide a voting system utilizing portable electronic storage media, such as optical disks, only as a redundant path of data transfer for ballot configuration information between an election headquarters and precincts, and as a security check to ensure data sent via modem matches configuration data sent via portable electronic storage media; with the primary mode of ballot configuration information transferred via computer modem from headquarters to the precincts to preclude delays that are possible when optical disks only systems are used and deliveries are untimely or made to incorrect locations.

Further Objects and Advantages

Further objects and advantages of the combination electronic and paper ballot voting apparatus, systems, and processes are to provide a voting method that:

- uses multiple paths of data transfer to thwart data tampering;
- provides multiple levels of reporting to use the system for any election jurisdiction, such as local, county, state, and federal levels;
- is scalable to fit any size jurisdiction, from one voting station to any number of stations;
- utilizes automatic self-testing features to ensure the system has been set up properly and is operable for an election;
- facilitates creation of multiple ballot styles for use in an election;
- tracks the activity of each voting station, such as time in use, time idle, number of voters that use a station, and that logs any irregularities or failures during an election;
- provides several redundant result reports from each precinct to election headquarters to add to system security;
- minimizes the need for voter training because of the familiar paper and pen;
- eliminates need for voter instructions to refer to the electronics under the ballot and the electronics in the pen;
- provides a method to complete an election in the event of a catastrophic electronics failure by using only the paper ballot; and
- eliminates inadvertent votes caused by pressure applied to the surface by the hand or finger of a voter, only when the electronic stylus makes a mark in an allowed area or box, does a vote register.

Still further objects and advantages will become apparent from a consideration of the ensuing description and drawings.

DRAWING FIGURES

In the drawings, closely related figures have the same number but different alphabetic suffixes.

Figure 2:
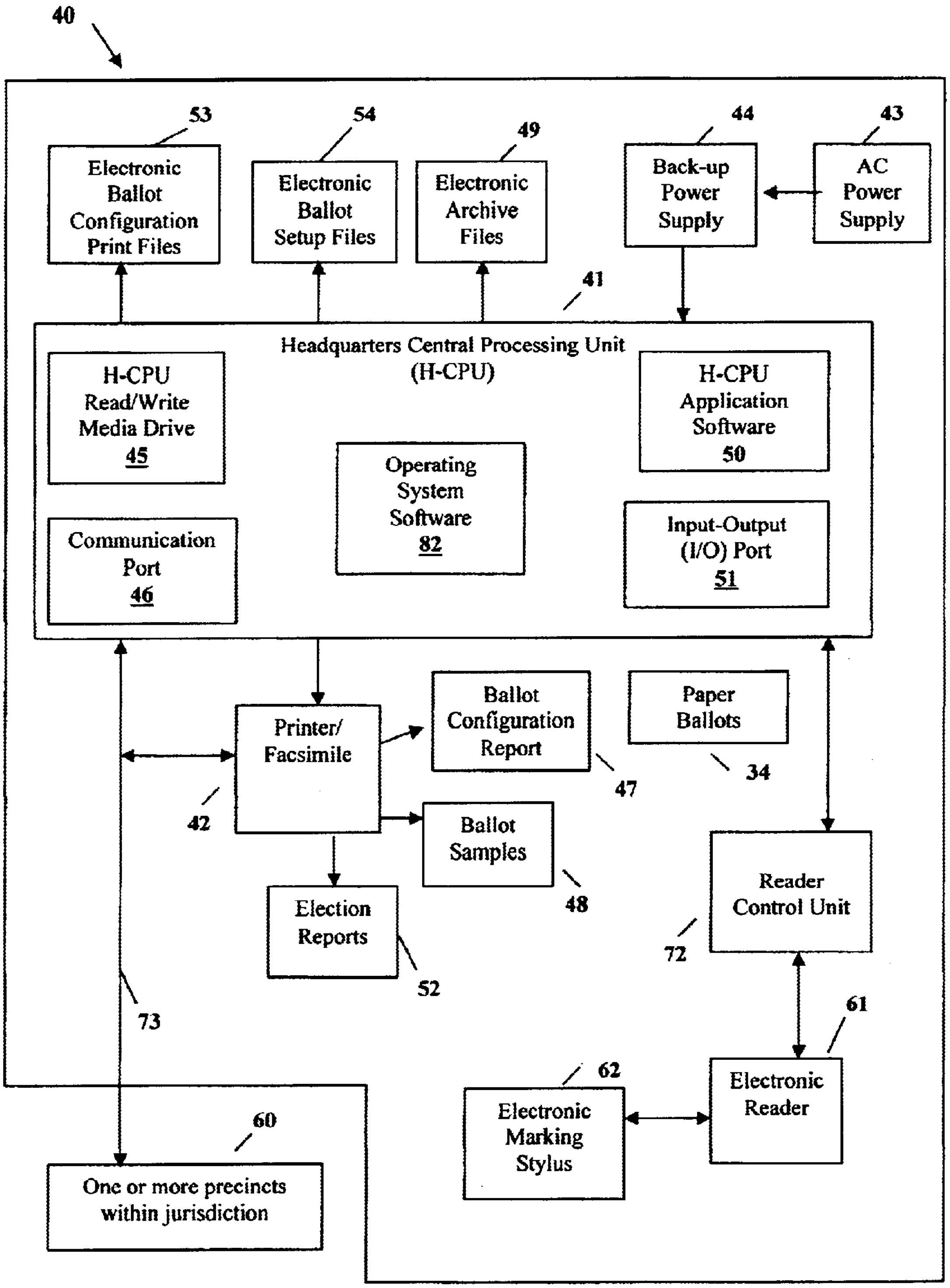
FIG. 2 is a block diagram showing headquarters processing unit and peripheral equipment at an election headquarters level above a precinct, such as city, county, parish, province, state, or federal.
Figure 2A:
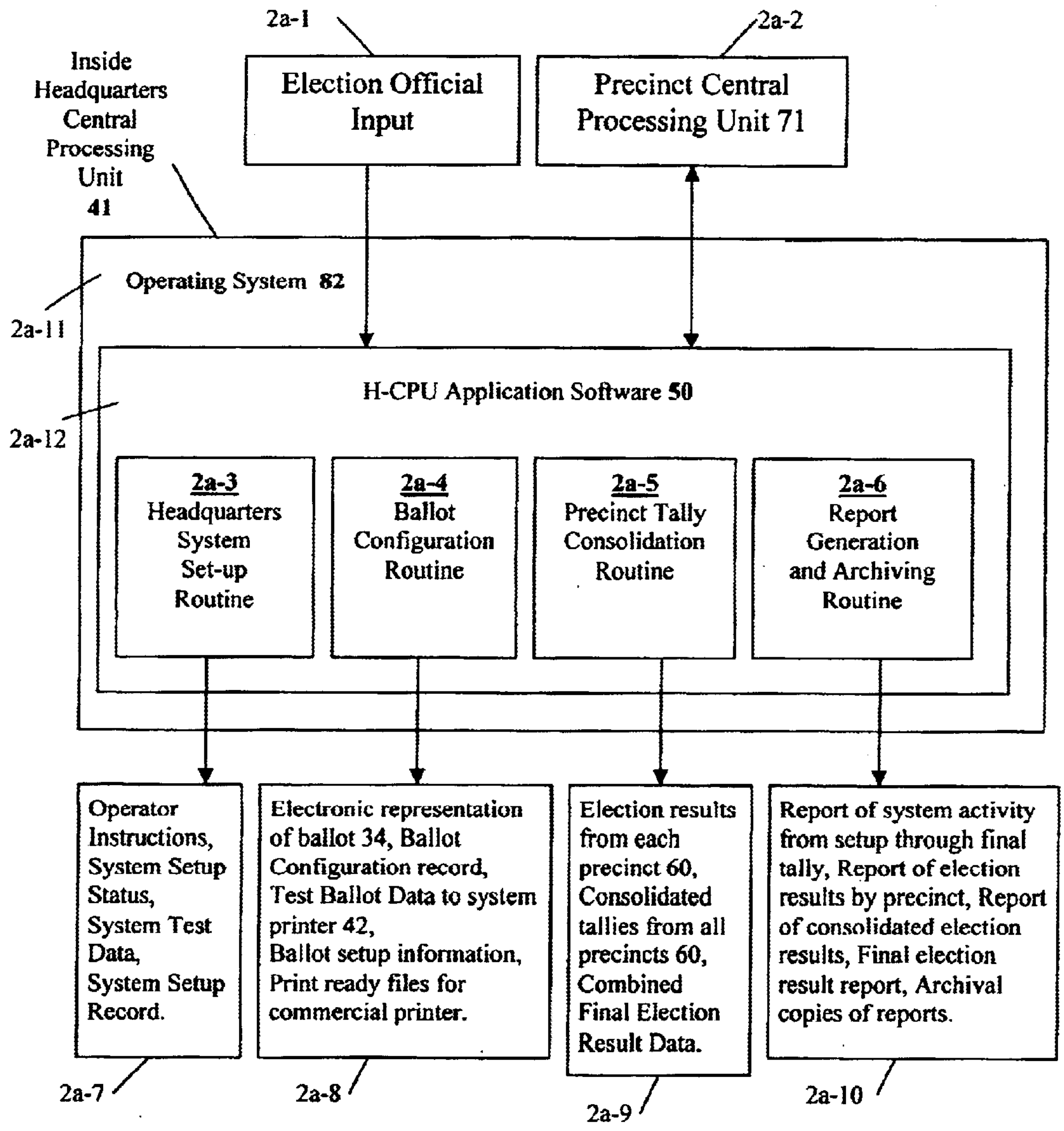

FIG. 2*a* is a Headquarters Central Processing Unit Software Block Diagram.

Figure 2B:
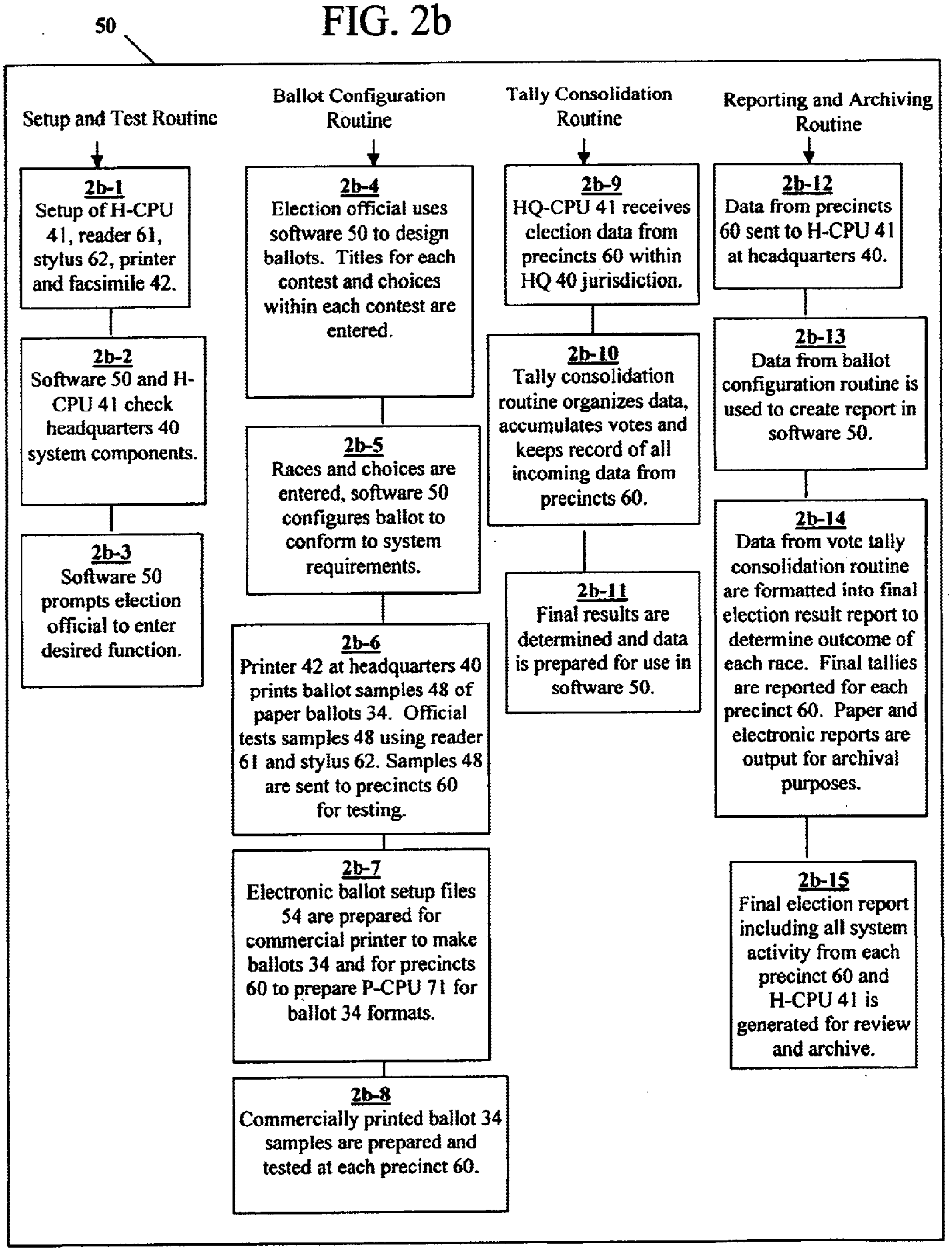

FIG. 2*b* is a Functional Block Flowchart of a Headquarters Central Processing Unit Software Routine.

Figure 3:
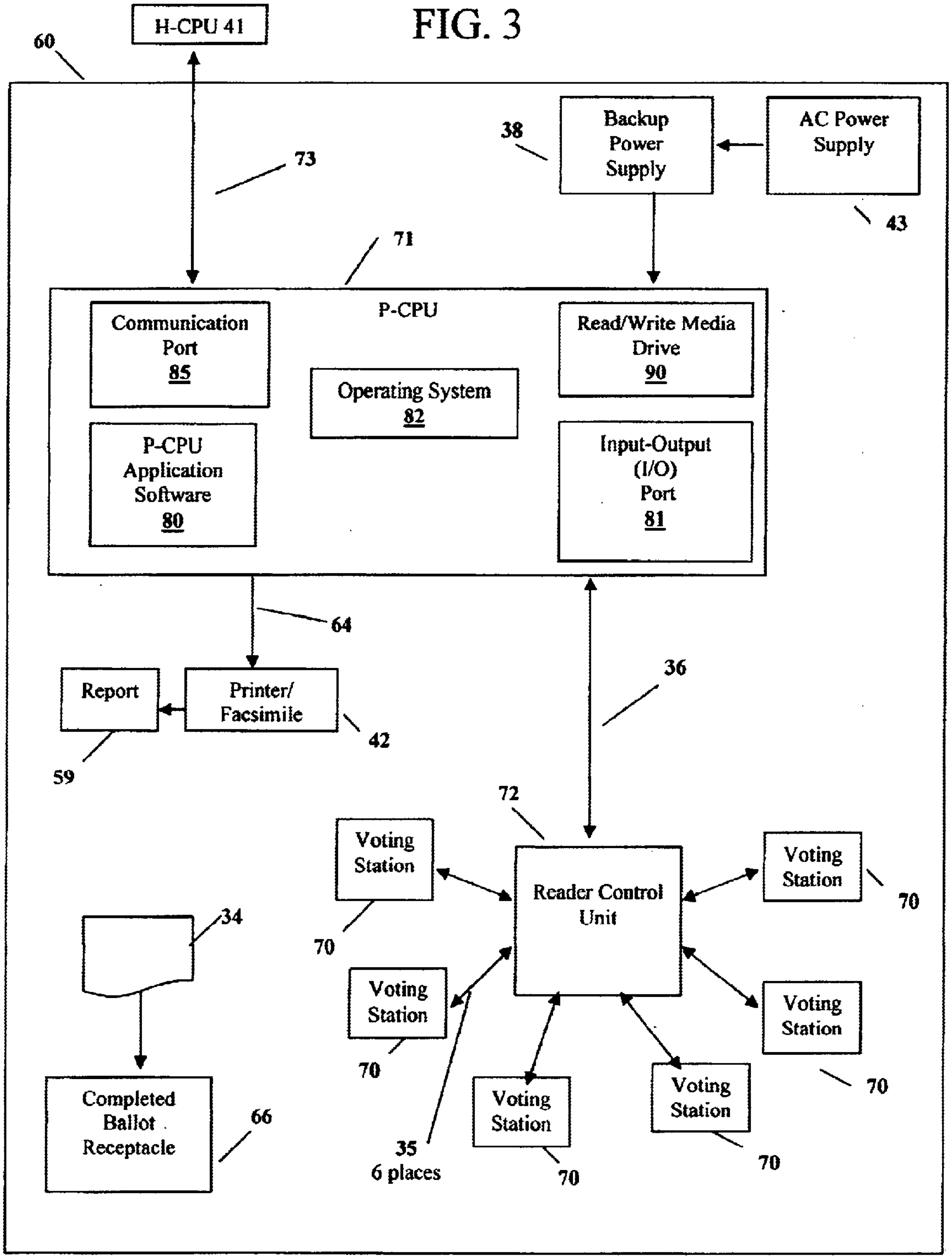

FIG. 3 is a block diagram of a precinct central processing unit and peripheral equipment, including power connections, and voting stations, and ballot receptacle at a precinct, or equivalent, level.

Figure 3A:
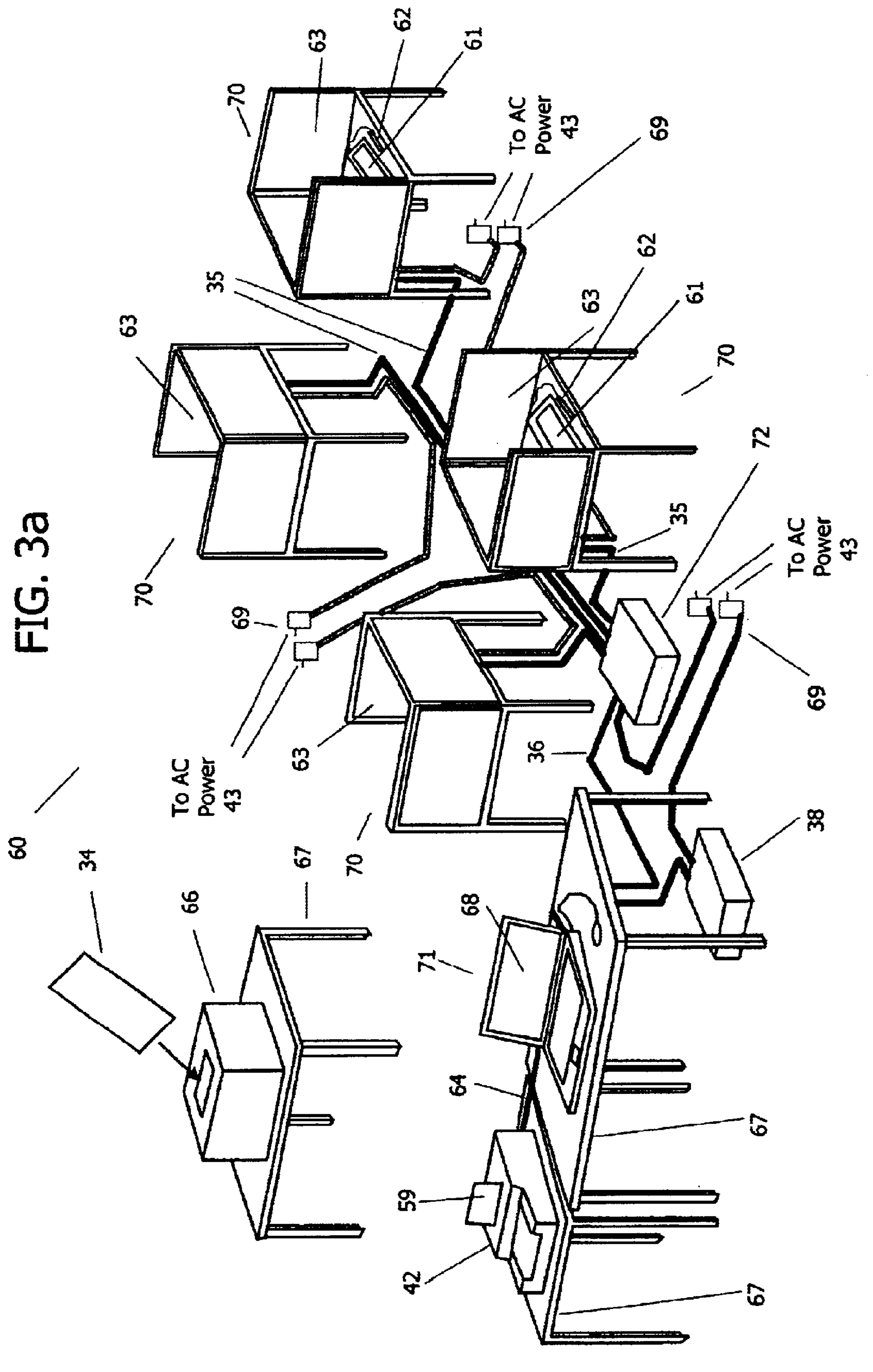

FIG. 3*a* is a drawing of a precinct, or equivalent level, depicting precinct central processing unit, peripheral equipment, and voting stations.

Figure 4:
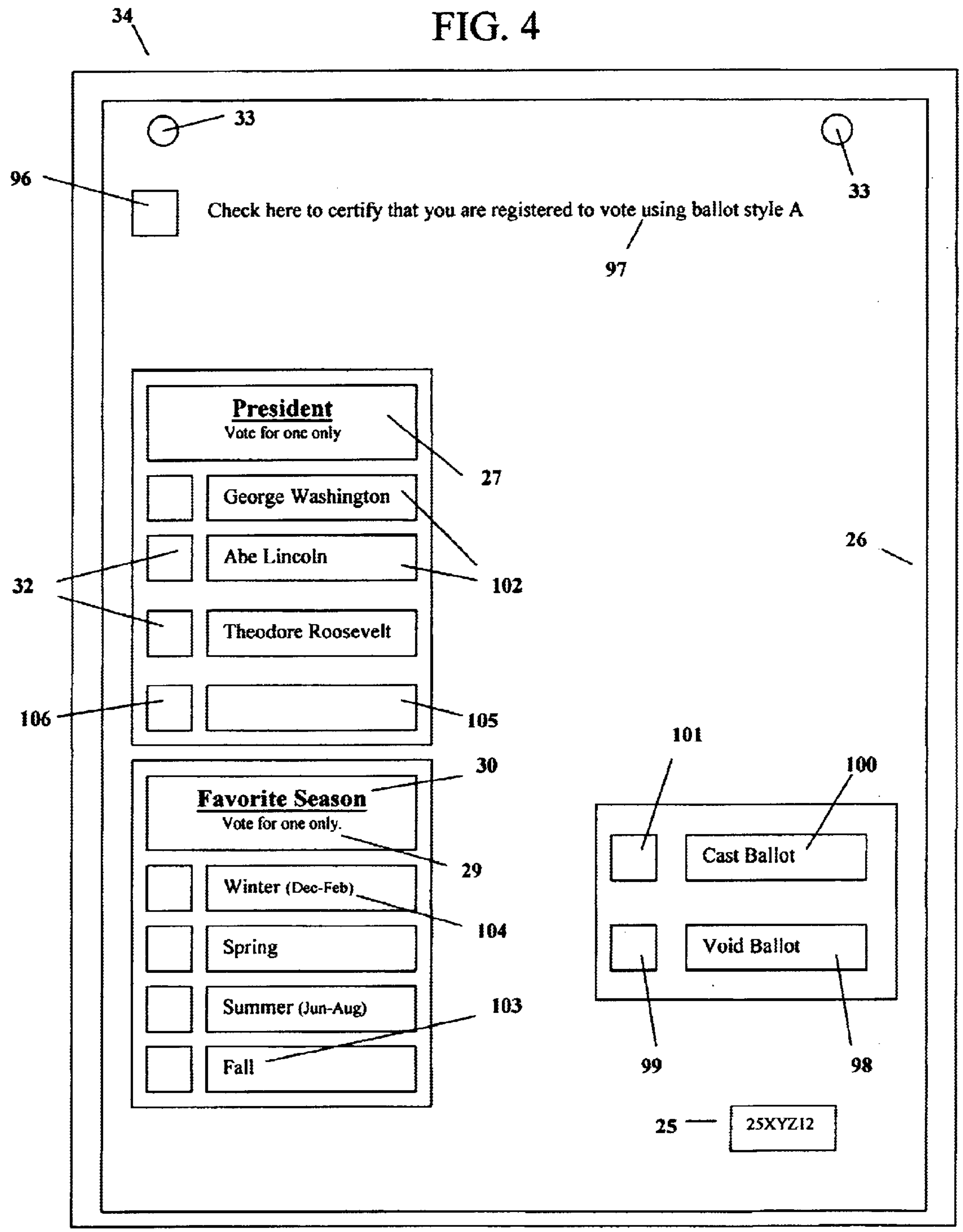

FIG. 4 is diagram of a configured paper ballot.

Figure 5:
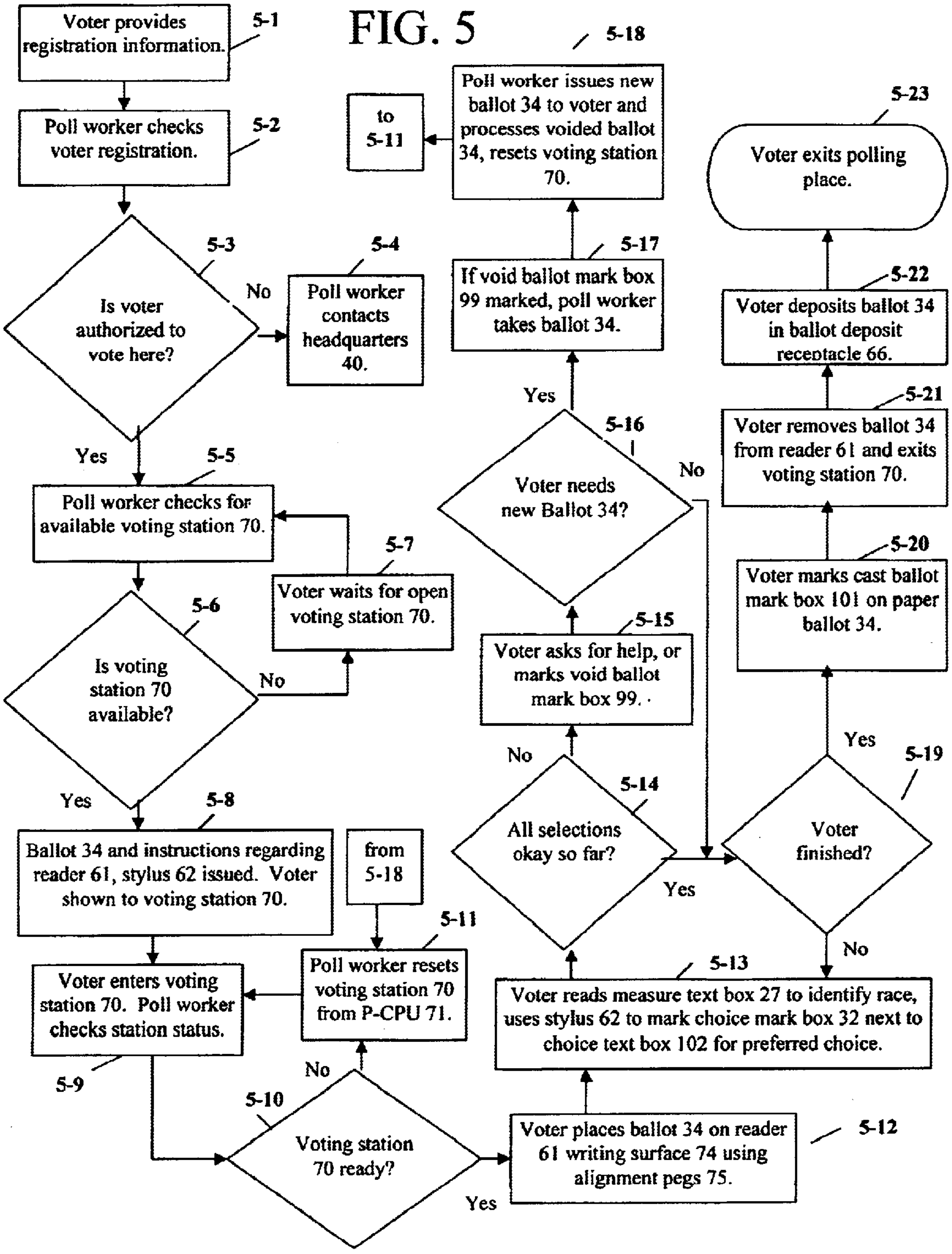

FIG. 5 is a Voting Process Flowchart.

Figure 6:
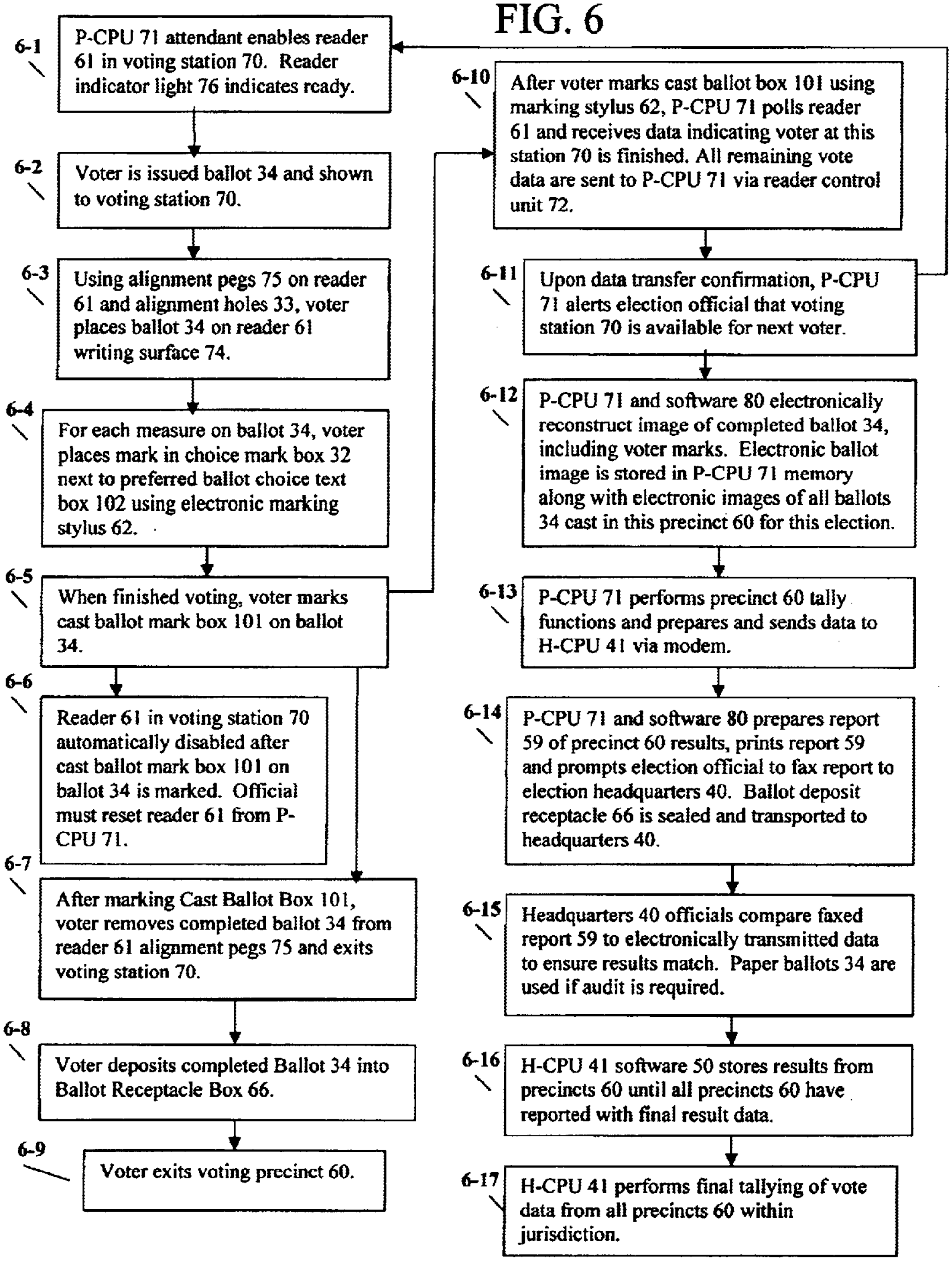

FIG. 6 is a Flowchart of Voting System General Operation.

FIG. 7 is a Precinct Central Processing Unit Monitor Display of messages needed for election officials to oversee electronic readers.

FIG. 7*a* is an outline of an electronic reader.

Figure 8:
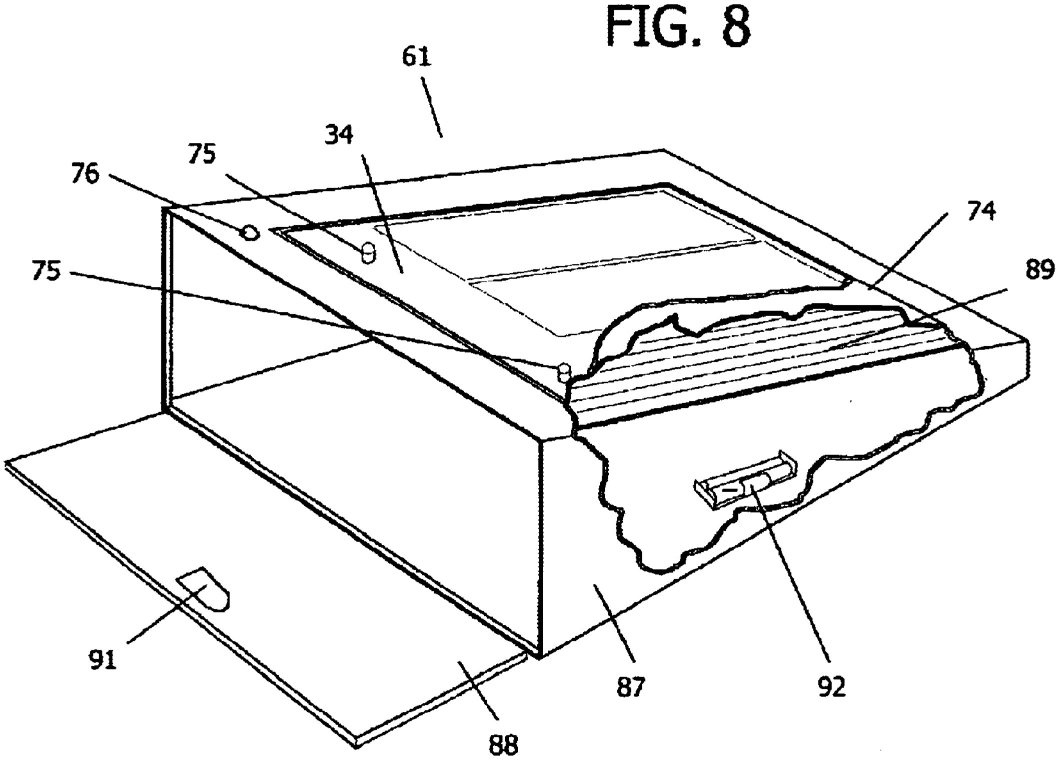

FIG. 7*b* is a box indicating a precinct central processing unit with precinct central processing unit software FIG. 8 is a drawing of a ballot in place on positioning pegs on Electronic Reader with reader cut-away exposing writing surface, XY coordinate input device, battery backup, and locking mechanism.

FIG. 8*a* is a block diagram of the Electronic Reader showing electronics of Reader.

Figure 9:
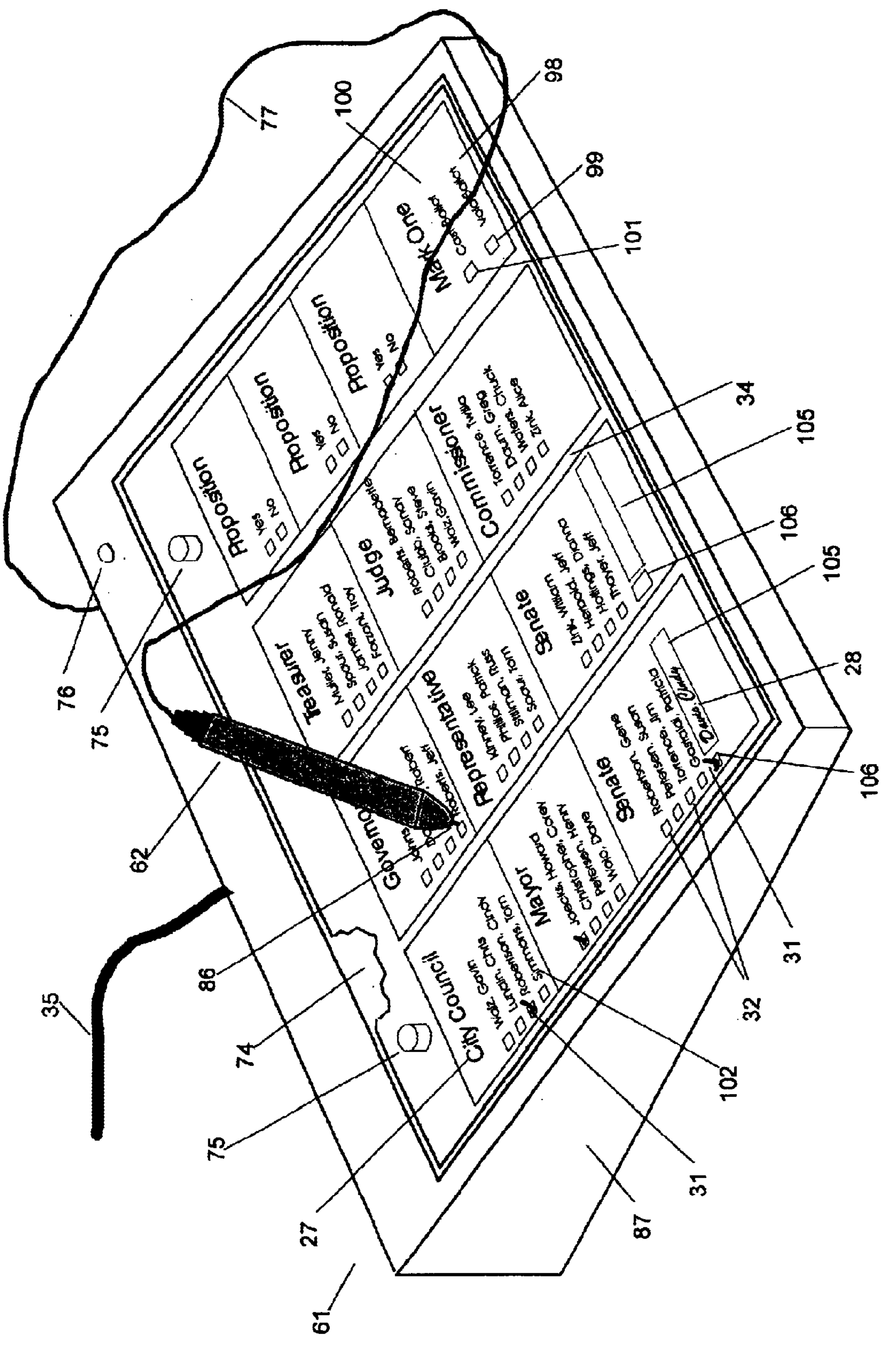

FIG. 9 is a drawing of the Electronic Reader showing a paper ballot on positioning pegs, electronic marking stylus, and indicator light with cutaway exposing writing surface.

Figure 10:
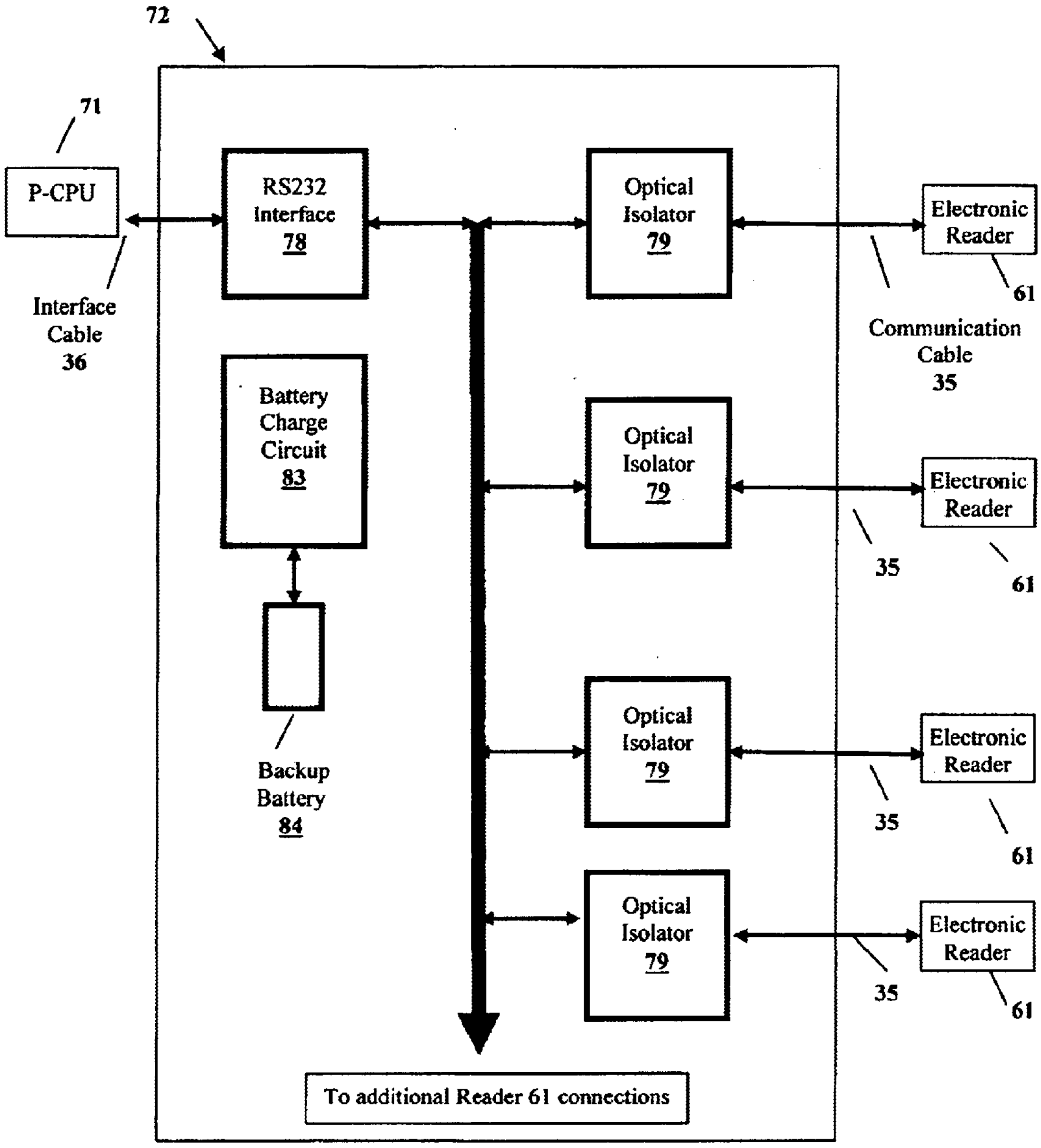

FIG. 10 is a block diagram of the Reader Control Unit.

Figure 11:
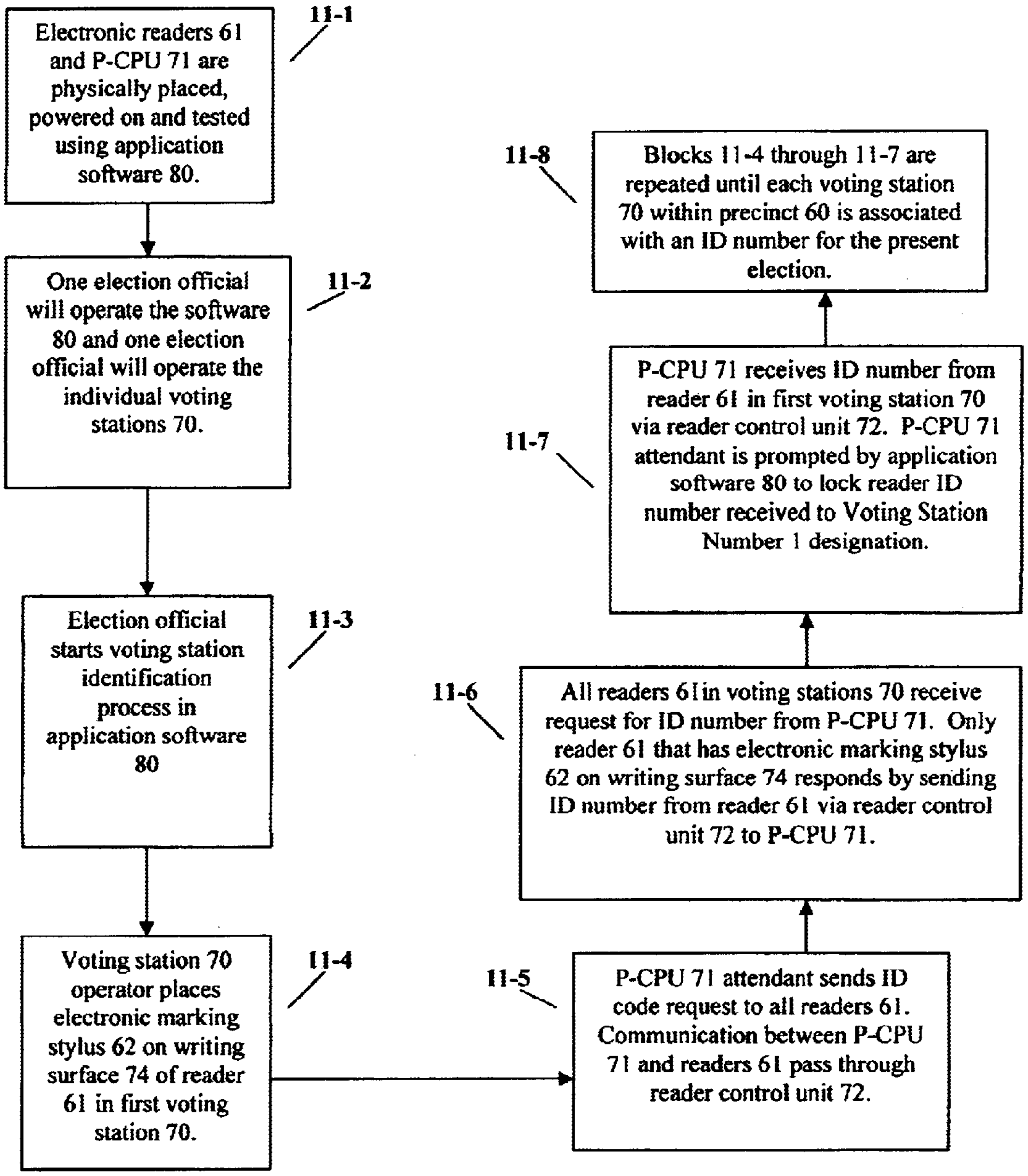

FIG. 11 is a Voting Station Identification Process Chart.

Figures 12A, 12B:
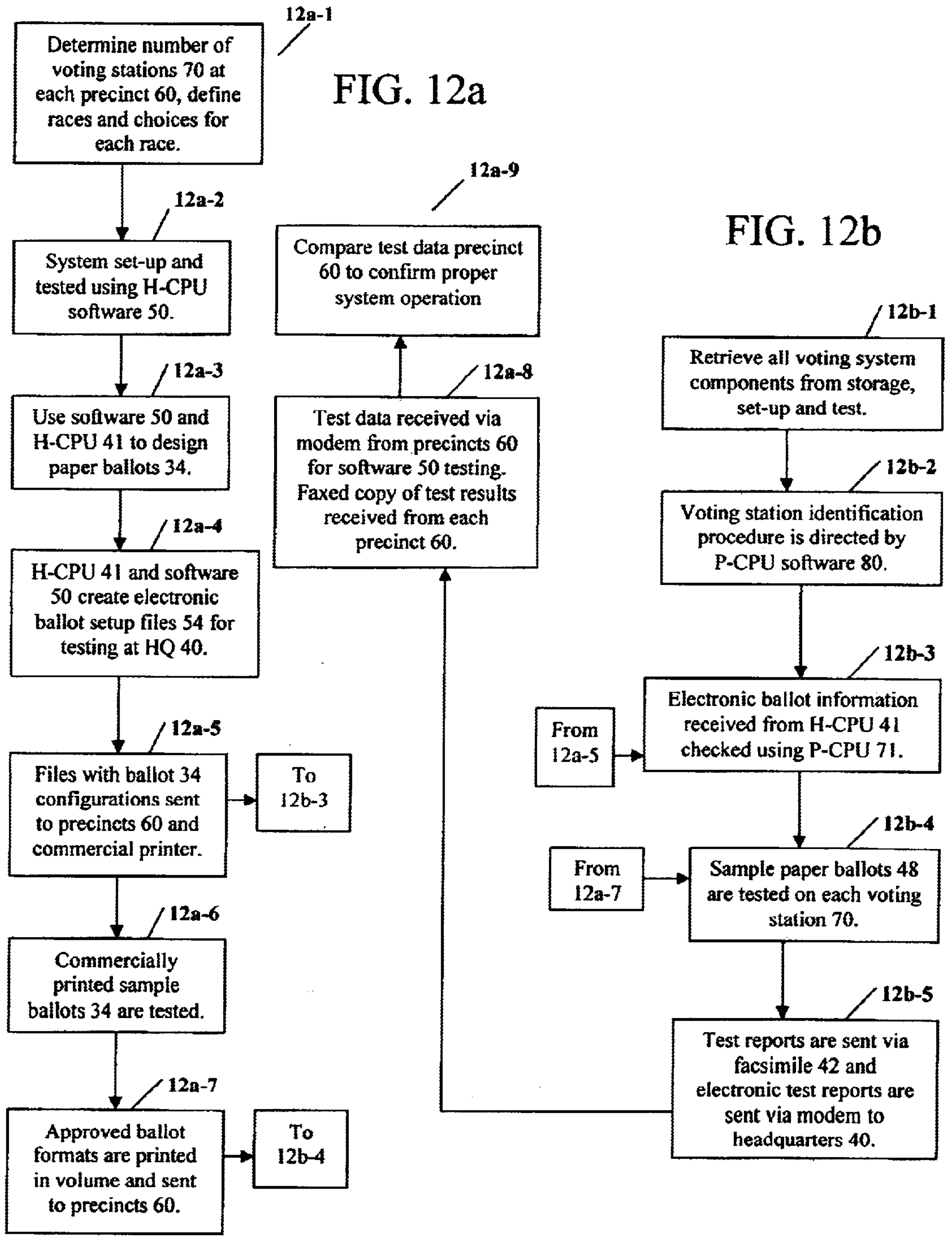

FIGS. 12*a* and 12*b* is a Chart of Headquarters Pre-election Activities and a Chart of Precinct Pre-election Activities.

Figures 13A, 13B:
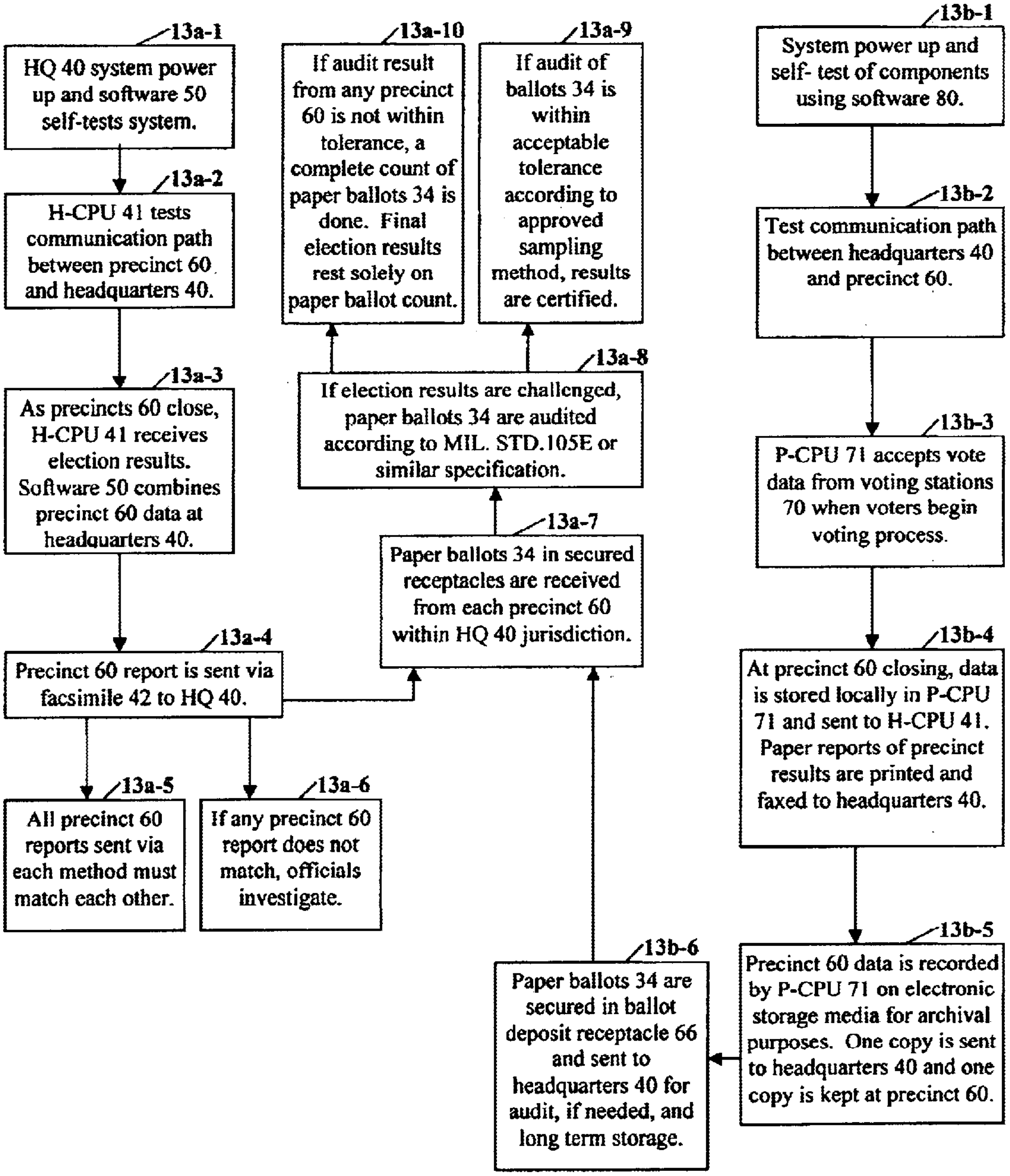

FIGS. 13*a* and 13*b* is a Chart of Headquarters Election Day Activities and a Chart of Precinct Election Day Activities.

Figure 14:
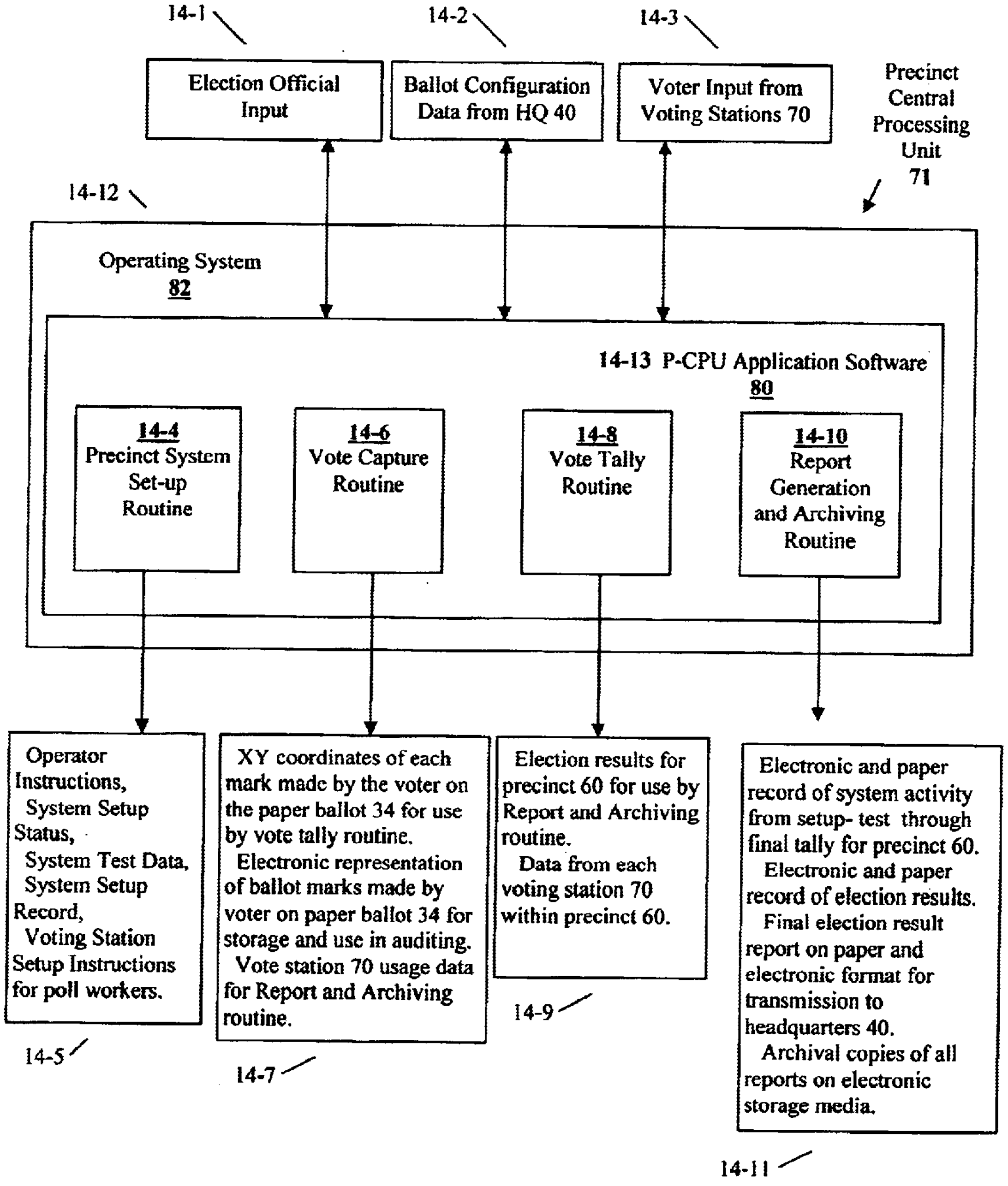

FIGS. 14 is a Software Block Diagram of a Precinct Central Processing Unit.

Figure 15:
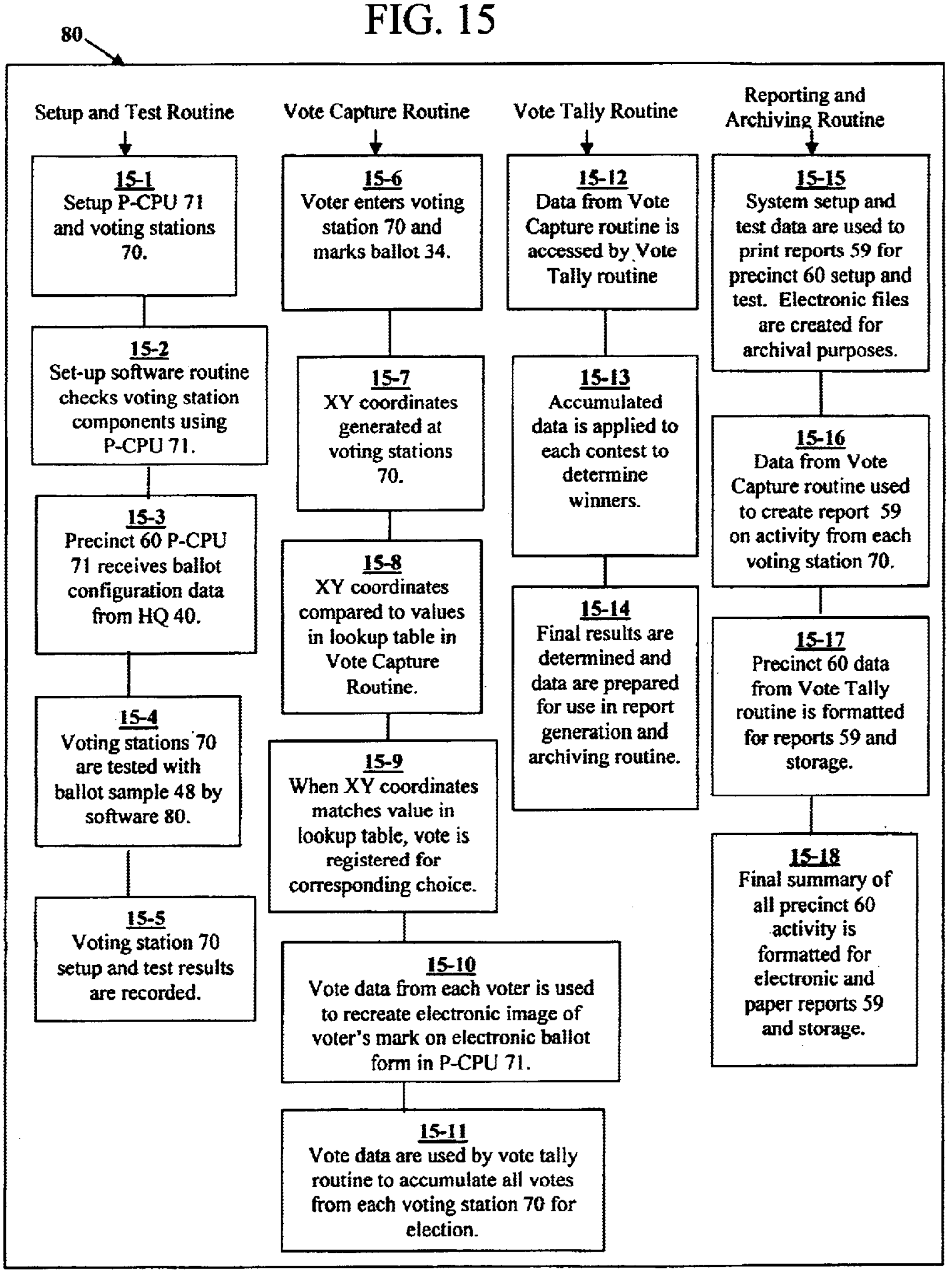

FIG. 15 is a Functional Block Diagram of a Precinct Central Processing Unit Software Routine.

Figure 16:
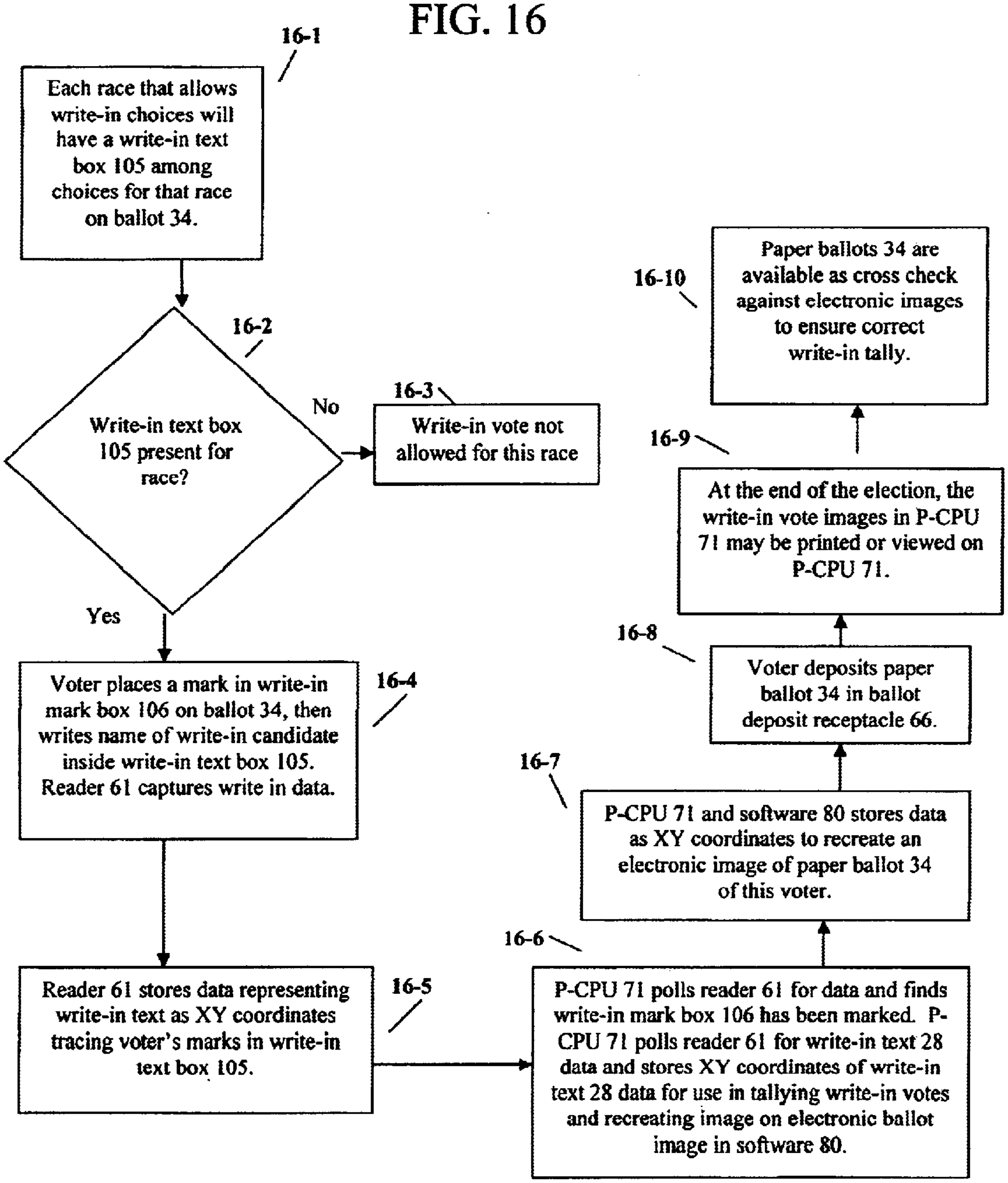

FIG. 16 is a Write-in Vote Process Chart.

Figure 17A:
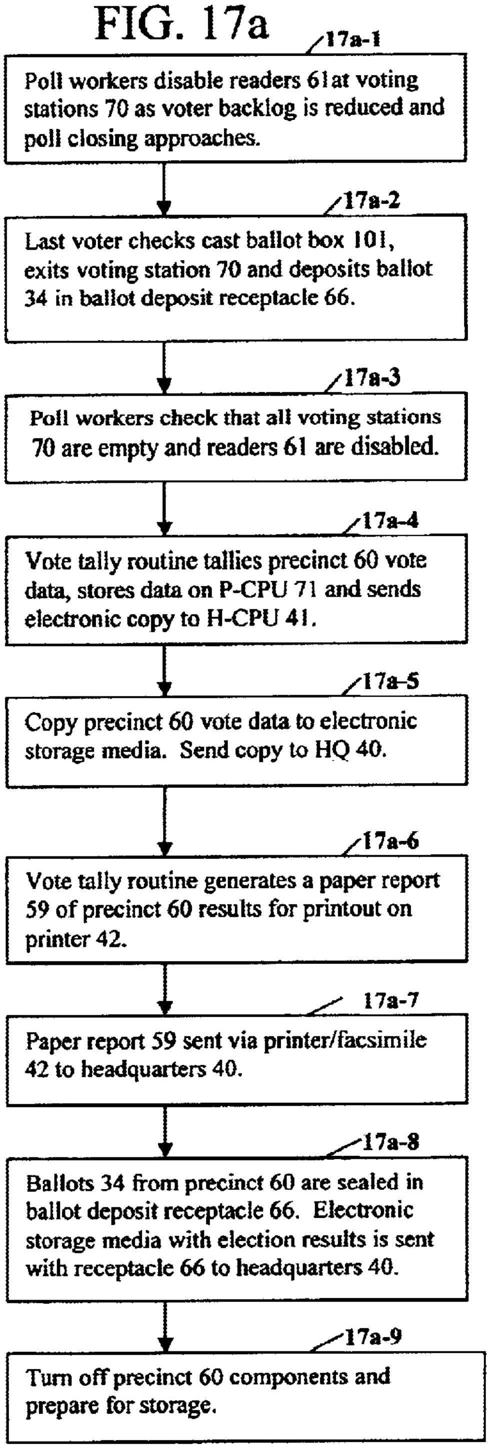
Figure 17B:
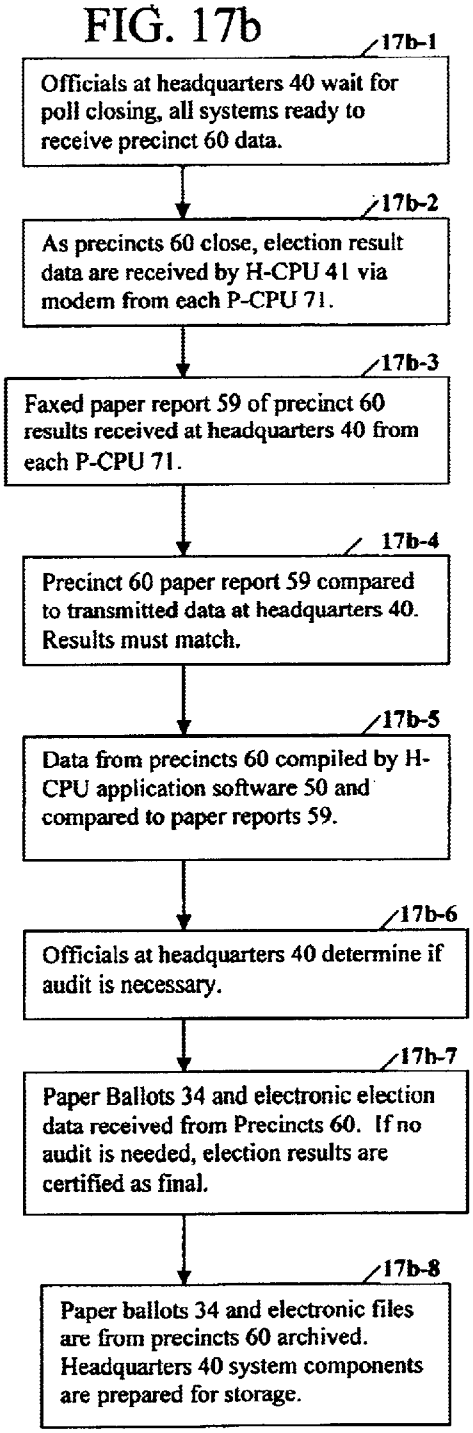

FIGS. 17*a* and 17*b* is a Chart of Precinct Poll Closing Activities and a Chart of Headquarters Poll Closing Activities.

Figure 18:
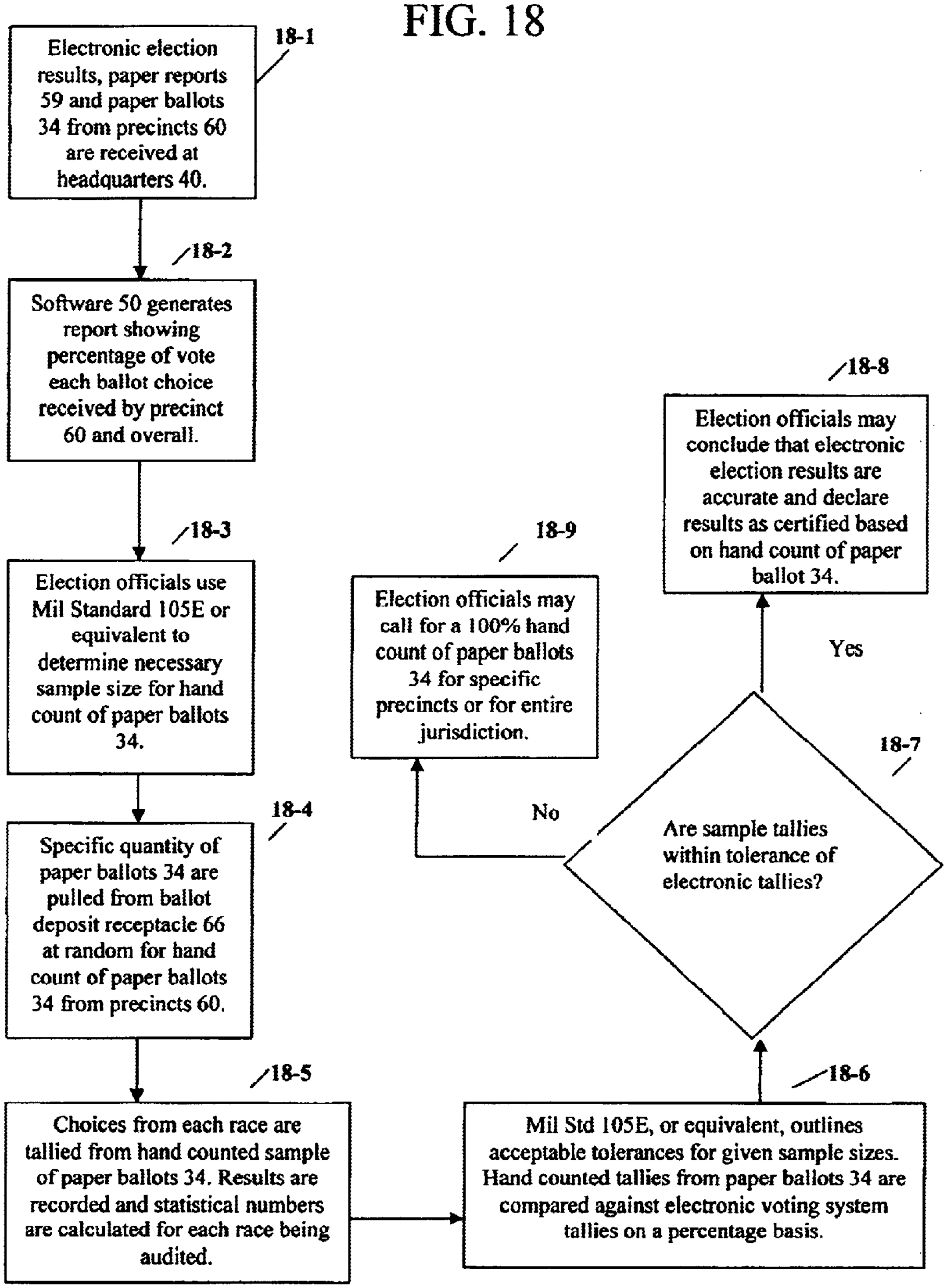

FIG. 18 is an Audit Process Chart.

Figure 19:
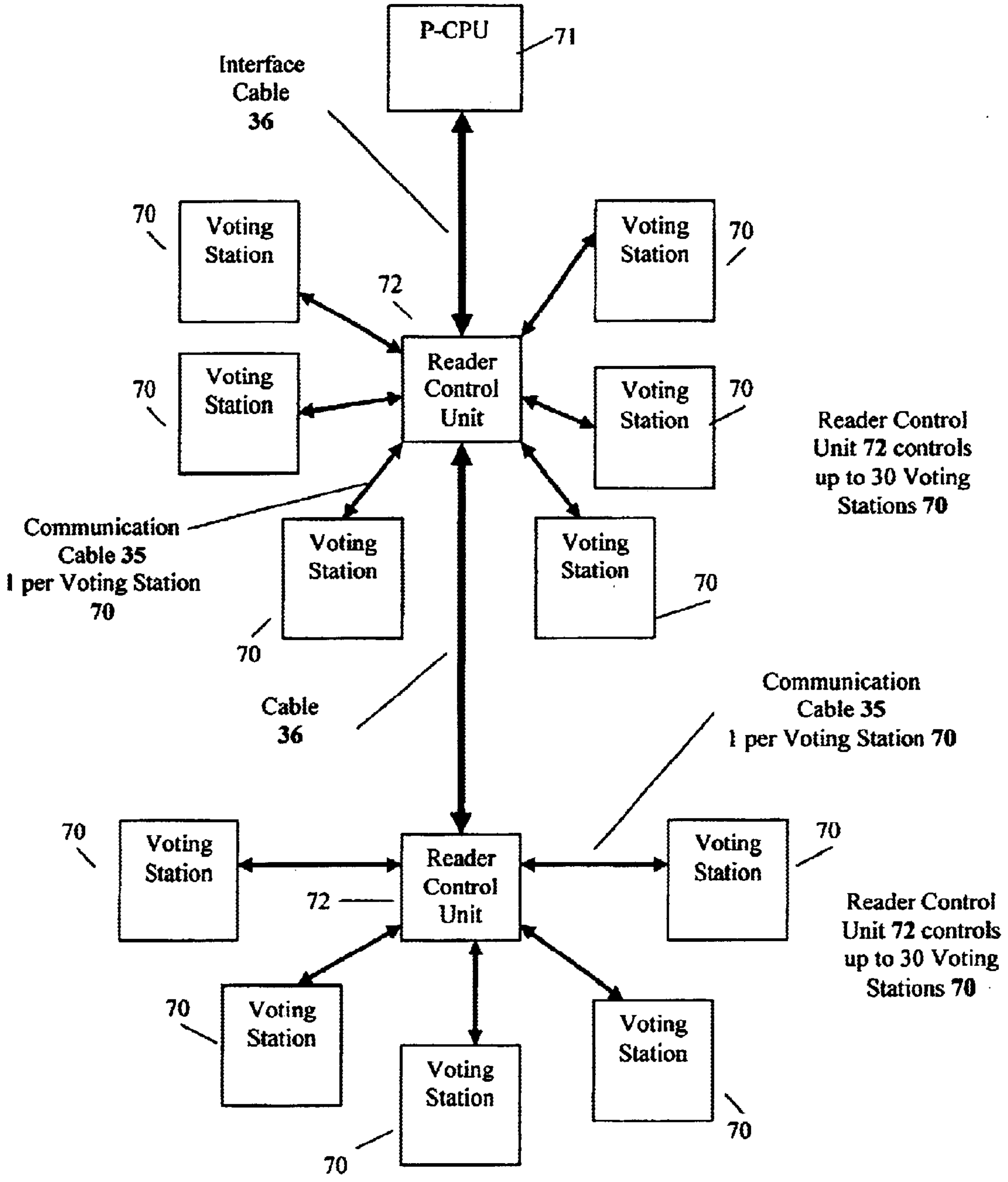

FIG. 19 is a block diagram of an expanded System at a precinct.

Figure 20:
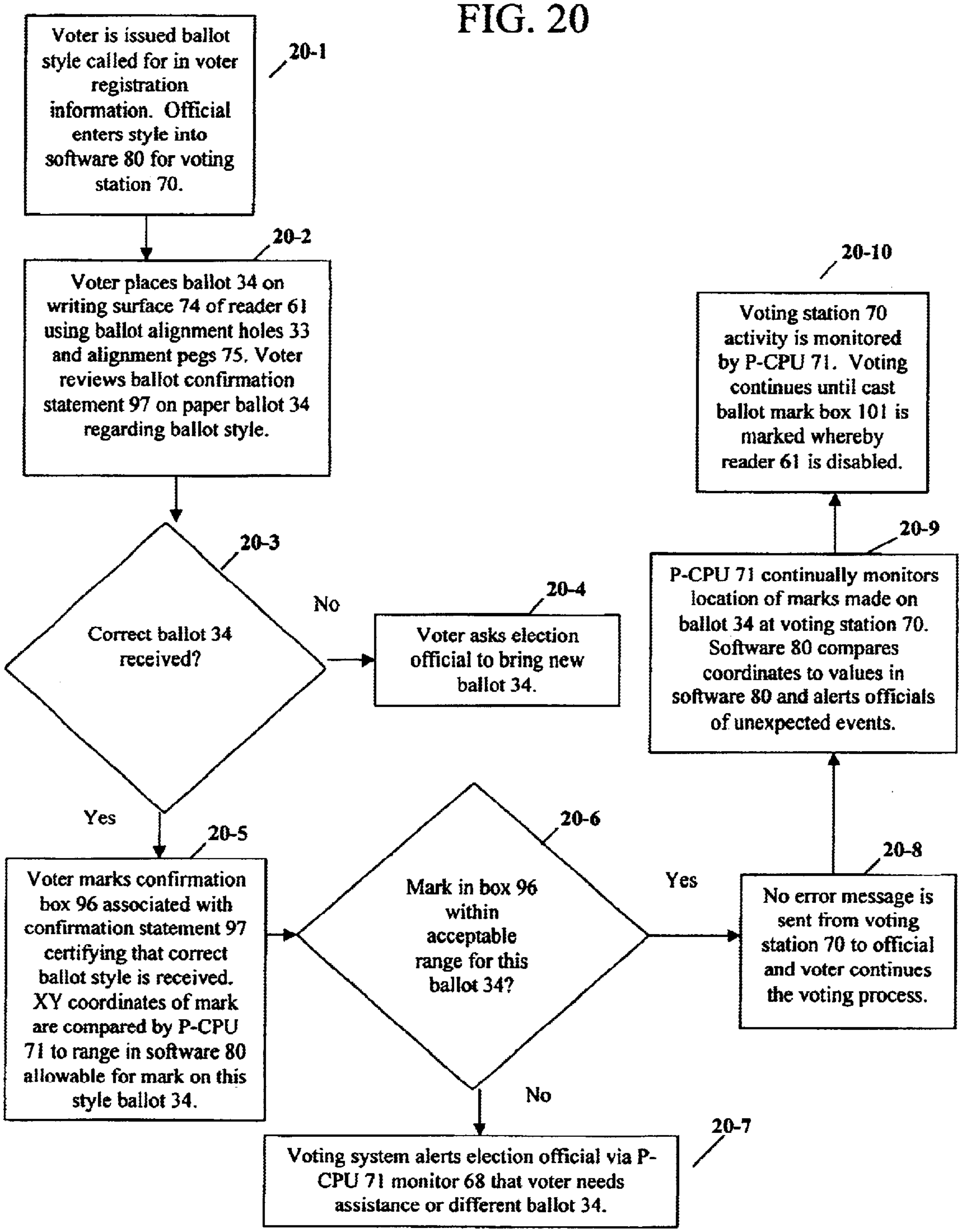

FIG. 20 is a block diagram of Ballot Style Detection Process.

REFERENCE NUMERALS ON DIAGRAMS AND DRAWINGS

25 configuration identification number
26 ballot border
27 ballot measure text box
28 voter write-in text
29 measure heading support text
30 ballot measure heading
31 voter ink mark
32 ballot choice mark box
33 ballot alignment holes
34 configured paper ballot
35 communication cable
36 interface cable
38 backup power supply
40 election headquarters
41 headquarters central processing unit
42 printer/facsimile
43 alternating current power supply
44 headquarters backup power supply
45 headquarters central processing unit (H-CPU) read/write media drive
46 headquarters central processing unit (H-CPU) communication port
47 ballot configuration report
48 configured paper ballot samples
49 electronic archive files
50 headquarters central processing unit (H-CPU) application software
51 H-CPU input/output (I/O) port
52 election reports
53 electronic ballot configuration print files
54 electronic ballot set-up files
59 paper report
0precinct
61 electronic reader
62 electronic marking stylus
63 privacy station
64 printer connecting cable
66 ballot deposit receptacle
67 worktables
68 computer monitor
69 reader power supply
70 voting station
71 precinct central processing unit (P-CPU)
72 reader control unit
73 communication connection
74 writing surface
75 alignment pegs
76 reader indicator light
77 electronic marking stylus connection cable
78 RS232 interface
79 optical isolators
80 precinct central processing unit (P-PCU) application software
81 P-CPU input/output (I/O) port
82 operating system
83 reader control unit charging circuitry
84 reader control unit backup battery
85 precinct central processing unit (P-CPU) communication port
86 electronic marking stylus inking tip
87 electronic reader housing
88 access door
89 XY coordinate input device
90 precinct central processing unit (P-CPU) read/write media drive

91 locking mechanism
92 battery backup
93 reader battery charging circuitry
94 serial communication circuitry
95 first in/first out (FIFO) memory
96 ballot confirmation mark box
97 ballot confirmation statement
98 void ballot text box
99 void ballot mark box
100 cast ballot text box
101 cast ballot mark box
102 ballot choice text box
103 ballot choice text
104 supporting information text
105 write-in text box
106 write-in mark box
110 federal level election headquarters
112 state level election headquarters

DESCRIPTIONS—FIG. 1—PREFERRED EMBODIMENT

Figure 1:
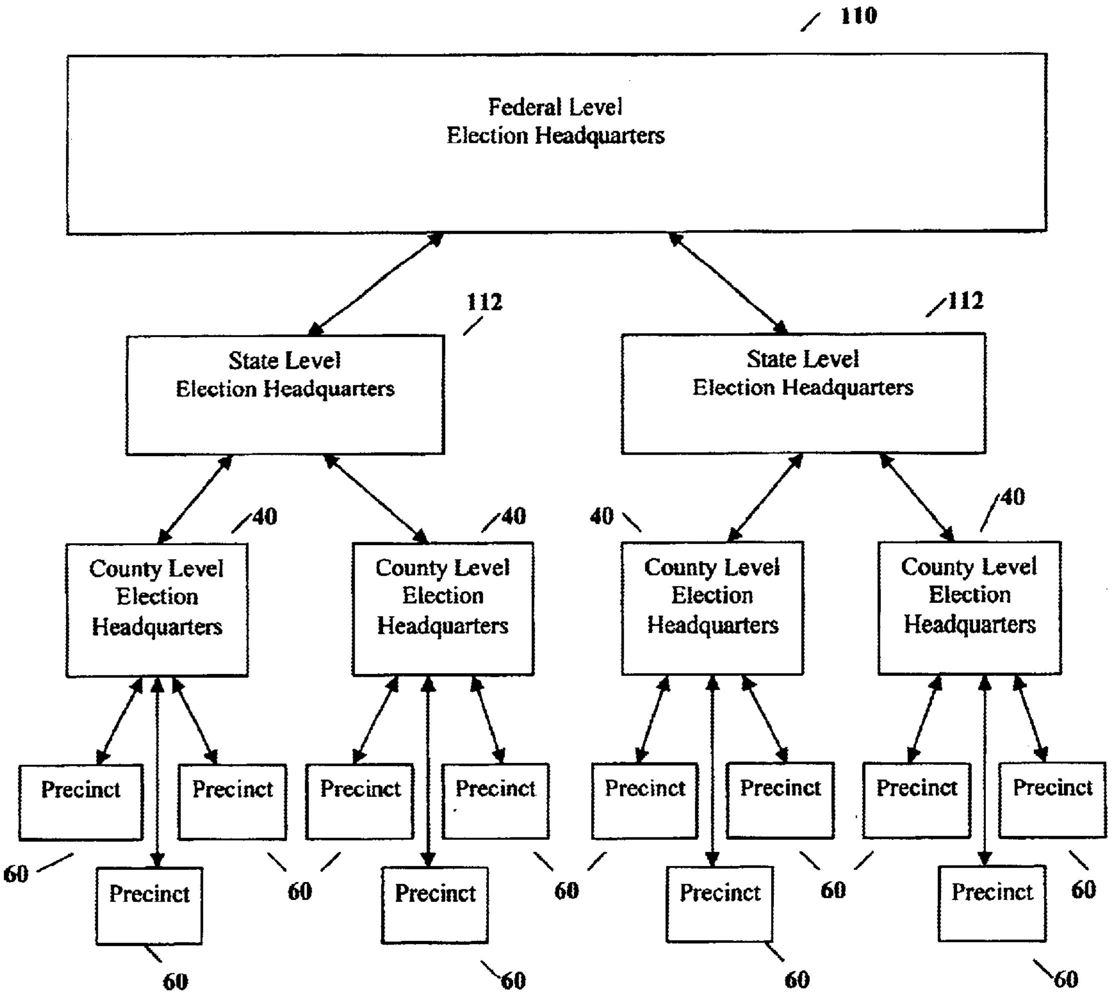
FIG. 1 is a block diagram showing overall system levels that is from highest, federal in United States or equivalent in other countries, to precinct or equivalent level. Federal Election Headquarters, State Election Headquarters, County/City Election Headquarters, and Precinct are shown.

In the preferred embodiment, a Combination Electronic and Paper Ballot Voting System consists of four levels of election control as depicted in FIG. 1. The highest level of election control is federal level election headquarters 110 a national or countrywide level that receives election reports from only one of the election levels below it. State level election headquarters 112, is any level immediately below headquarters 110. State headquarters 112 consolidates election results from election levels required to report to it, and can transfer results to federal headquarters 110 as required. Election headquarters 40 represents election headquarters of any jurisdiction one step above precinct level, such as county, city, parish, district, borough, or regional level. For county-only elections, this is the highest level of tabulation required. For state-wide-elections, each headquarters 40 consolidates precinct data and transfers results to next highest reporting level. In most cases, for state-wide-elections this is the highest level of tabulation required, but in some cases headquarters 40 provides election reports to federal level headquarters 110.

Precinct 60 is the fourth level, the level serving as specified voting location for an election. Precinct 60 reports to the next higher election level, typically county election headquarters 40. Accumulated voter data from each precinct 60 are transferred from precinct 60 to headquarters 40. Election results from all precincts 60 are gathered and consolidated by headquarters 40.

In the preferred embodiment, election headquarters 40, state level election headquarters 112, and federal level headquarters 110 follow identical procedures and systems and use the same configurations; therefore, headquarters 40 represents all levels above precincts 60. When elections require additional levels of reporting, the pattern of consolidation of data and transfer to next highest election headquarters level continues until highest level of reporting is reached and a final election result is determined.

DESCRIPTIONS—FIG. 2—PREFERRED EMBODIMENT

A preferred embodiment of the Combination Electronic and Paper Ballot Voting System are the apparatus, systems, and processes of an election headquarters 40 diagrammed in FIG. 2 Headquarters Block Diagram. In the preferred embodiment, all election headquarter levels above precinct level are represented by headquarters 40.

Headquarters 40 configures ballots for each precinct 60 within its jurisdiction, generates reports showing jurisdiction election results, and facilitates long-term storage of election results. Headquarters 40 consists of the following key components diagrammed on FIG. 2:

- headquarters central processing unit (H-CPU) 41, with operating system 82, H-CPU read/write media drive 45, headquarters central processing unit application software 50, communication connection 73, such as internal modem or Internet connection, H-CPU input/out (I/O) port 51;
- alternating current power supply 43, headquarters backup power supply 44;
- printer/facsimile 42;
- communication connection, 73 such as a telephone line or Internet connection; and
- reader control unit 72, electronic reader 61, and electronic marking stylus 62.

Components of Headquarters Central Processing Unit on FIG. 2

H-CPU 41 is a commercially available microprocessor-based personal computer with computer monitor, keyboard, and input device, such as a mouse. H-CPU 41 hardware components required by the present invention are commercially available and include a H-CPU read/write media drive 45, such as a read/write CD-ROM drive; one or more H-CPU input/output (I/O) ports 51, such as a Universal Serial Bus port; a commercially available printer/facsimile 42; and an H-CPU communication port 46, such as an internal modem or Internet connection.

In the preferred embodiment, H-CPU 41 utilizes operating system 82 and custom H-CPU application software 50. Software 50 (FIGS. 2*a* and 2*b*) is installed under control of system vendor. Functions performed by H-CPU 41 after installation of system 82 and custom H-CPU application software 50 include:

- system set-up, testing and reporting at election headquarters 40.
- ballot definition and configuration for multiple precincts 60 for each election.
- pre-election testing and reporting at election headquarters 40.
- headquarters vote consolidation from precincts 60.
- ongoing and final vote tabulation functions for consolidated precinct tallies.
- creation of electronic archive files 49 for storage of election archival data.
- Generation of final election reports 52, which includes paper versions, and electronic versions.
- Backup election data storage including an electronic image of each cast ballot.

H-CPU 41 and printer/facsimile 42 operate by means of an alternating current power supply 43 or power available where equipment is located including power configurations existing in countries outside the United States. Commercially available headquarters backup power supply 44 is connected to alternating current power supply 43. Backup power supply 44 monitors power levels and automatically provides system power in case of power outage.

Headquarters 40 uses electronic reader 61 with attached electronic marking stylus 62 as part of ballot design process. Routines within H-CPU application software 50 facilitate reader 61 communication with H-CPU 41 via I/O port 51 and reader control unit 72. H-CPU 41 and H-CPU application software 50 are used to design precise layout for paper ballots.

Printer/facsimile 42 is used with H-CPU 41 and H-CPU application software 50 to produce printed configured paper ballot samples 48 at an election headquarters 40 location. Designed ballot is tested using reader 61 and stylus 62. After testing is completed, ballot samples 48 are maintained for comparison against commercially printed ballots to be used in an election. Ballot configuration report 47 is printed.

A communication connection 73, such as a telephone line, cable Internet connection or wireless communication, is used for communication of voter election data between headquarters 40 and precinct 60.

Each headquarters 40 level acts as election headquarters for several precincts 60 under its jurisdiction. Each headquarters 40 produces election reports 52 and maintains electronic ballot set-up files 54, electronic ballot configuration print files 53, and electronic archive files 49.

Headquarters Central Processing Unit Software on FIGS. 2, 2*a*, and 2*b*

H-CPU 41 operates with an operating system 82 (Block 2*a*-11) designed specifically for the present invention to optimize system efficiency, reliability, and security. H-CPU application software 50 (Block 2*a*-12) consists of routines designed to perform specific functions pertaining to the set-up, test, and operation of the present invention.

There are various outputs of headquarters system set-up routine (Blocks 2*a*-3 and 2*a*-7) within H-CPU application software 50.

Election official performs the physical set-up of H-CPU 41, much as a typical personal computer is set-up. Headquarters printer/facsimile 42 and electronic reader 61, with stylus 62, are connected with appropriate cables. (Blocks 2*a*-1 and 2*b*-1 and FIG. 2)

System set-up software routine of H-CPU 41 self-checks headquarters' system components. If any component fails, H-CPU application software 50 displays a message on computer screen of H-CPU 41 that describes problem and suggests corrective action. If all components pass test, the message indicates system has passed all tests and prompts election official to generate a printout showing that all components are correctly connected and functioning properly. (Blocks 2*a*-1 and 2*b*-2)

After system functionality is confirmed, application software 50 prompts election official to choose the desired function. Choices include ballot configuration routine, tally consolidation routine, or reporting and archiving routine. (Blocks 2*a*-1 and 2*b*-3)

Ballot Configuration Routine of H-CPU Application Software 50 in FIGS. 2*a* and 2*b*

Ballot configuration routine facilitates creation of each ballot style to be used for a particular election. (Block 2*a*-4) There are various outputs of ballot configuration routine. (Block 2*a*-8)

Election official designs ballot styles for an election. Titles for each contest and choices within each contest are entered in H-CPU application software 50. (Blocks 2*a*-1 and 2*b*-4) When all contests and choices are entered, software 50 automatically configures ballot to conform to system requirements (Block 2*b*-5) including configuration to permit straight ticket voting.

A paper ballot sample for each different ballot configuration is printed on printer/facsimile 42 at headquarters. (Block 2*b*-6) Election official tests each ballot configuration using configured paper ballot sample, H-CPU 41, reader 61 and stylus 62. (FIG. 2) Test simulates actual process voters will use to complete ballots. When official is satisfied that ballots are correct, additional samples are printed to be used at precincts to test their systems.

Electronic ballot set-up files are prepared to send ballot configuration data to commercial printers for ballot printing. Electronic files, such as those used to create an electronic image of the entire ballot, are prepared and sent to precincts 60 to prepare precinct central processing units 71 for an upcoming election. (Block 2*b*-7) Commercially printed ballots for each configuration are prepared and samples are tested. When confirmed, ballots 34 are sent to each precinct 60. Report data are created to track the ballot configuration process. (Block 2*b*-8)

Precinct Tally Consolidation Routine of H-CPU Application Software 50 on FIGS. 2*a* and 2*b*

There are various outputs of a precinct tally consolidation routine. (Block 2*a*-9)

H-CPU 41 receives vote data from each precinct 60 within jurisdiction of an election headquarters via P-CPU 71 at each precinct 60. (Blocks 2*a*-2 and 2*b*-9)

Precinct tally consolidation routine compiles all received data and determines election results from each precinct 60, consolidates tallies from all precincts 60 in jurisdiction, and determines final elections results. (Blocks 2*a*-5, 2*a*-9 and 2*b*-10)

Final results are determined and data are prepared for report generation and archiving routine of H-CPU application software 50. (Block 2*b*-11)

Report Generation and Archiving Routine of H-CPU Application Software 50 on FIGS. 2*a* and 2*b*

A routine produces electronic files and paper reports of H-CPU 41 activity from initial set-up and testing through final tally for precincts 60 within headquarters jurisdiction. Electronic and paper format records of consolidated election results for precincts 60 within headquarters jurisdiction, including final election result reports and archival copies are generated. (Blocks 2*a*-6, 2*a*-10 and 2*b*-12)

Electronic and paper copies of reports on ballot configuration process are created from data generated during a ballot configuration routine of H-CPU application software 50 to document ballot configuration process for each election. (Block 2*b*-13)

Report generation and archiving routine of H-CPU application software 50 receives data from precinct vote tally consolidation routine and formats data into final election result reports.

Final tallies are reported for each precinct 60 within the jurisdiction and for electronic and paper reports and archival purposes. (See 2*b*-14) Final election reports, including all system activity from each precinct 60 with the election jurisdiction and H-CPU 41 activity logs are formatted for electronic and paper reports and long-term storage. (Block 2*b*-15)

DESCRIPTIONS—FIGS. 3 AND 3*a*—PRECINCT PREFERRED EMBODIMENT

A preferred embodiment of the Combination Electronic and Paper Ballot Voting System are the apparatus and procedures of a precinct 60 consisting of the following components diagrammed on FIG. 3 and illustrated in FIG. 3*a:* precinct central processing unit 71 is a commercially available microprocessor based personal computer with monitor 68, keyboard, and input device, such as a mouse. P-CPU 71 hardware components required by the present invention are commercially available and include a P-CPU read/write media drive 90, such as a read/write CD-ROM or DVD drive; one or more P-CPU input/output (I/O) ports 81, such as a USB port; and P-CPU communication port 85, such as for an internal modem or Internet connection;

alternating current power supply 43;

backup power supply 38 for P-CPU 71;

one reader control unit 72 for up to thirty voting stations 70, with interface cable 36;

commercially available printer/facsimile 42 with printer connecting cables 64;

one or more voting stations 70, each consisting of one electronic reader 61 with attached electronic marking stylus 62;

one privacy station 63, such as a stand or table, for each voting station 70;

one communication cable 35 for each electronic reader 61;

one reader power supply 69, such as a wall mounted transformer, for each electronic reader 61;

communication connection 73, such as a telephone line or Internet connection, provided by host building as communication method between P-CPU 71 and election headquarters;

secure ballot deposit receptacle 66 for completed ballots 34 at each precinct 60, with lock to maintain secrecy of marked ballots 34; and commercially available worktables 67 to support ballot receptacle 66, P-CPU 71, and printer/facsimile 42.

Precinct 60 is comprised of precinct central processing unit 71 with precinct central processing unit application software 80, reader control unit 72, and from one to thirty voting stations 70 depending on space available and specific needs of election officials. Each voting station 70 is comprised of privacy station 63, electronic reader 61 with attached electronic marking stylus 62. Each reader 61 is connected to a reader control unit 72 via communication cable 35. Reader control unit 72 is connected via interface cable 36 to the P-CPU 71 to provide communication interface between readers 61 at each voting station 70 and P-CPU 71. Data from P-CPU 71 and reader 61 passes through reader control unit 72.

Description of Power Supply and Connections on FIGS. 3 and 3*a*

P-CPU 71 and printer/facsimile 42 operate by means of an alternating current power supply 43 or power available where equipment is located including power configurations existing in countries other than the United States. Commercially available back-up power supply 38 ensures P-CPU 71 continues to be operational in the event of a power failure.

Communication between P-CPU 71 and H-CPU 41 is via P-CPU communication port 85 and communication connection 73, a telephone line or high-speed Internet connection, such as a cable modem, provided by precinct 60 hosting building.

Description of Ballot Receptacles and Worktables on FIGS. 3 and 3*a*

An opaque secure ballot deposit receptacle 66 is required for completed ballots 34 deposited by voters, to ensure ballots 34 are secured and not visible.

Commercially available worktables 67 provide support for P-CPU 71, and printer/facsimile 42 for printing of paper reports 59.

DESCRIPTION—FIGS. 14 AND 15—PREFERRED EMBODIMENT

A preferred embodiment of the Combination Electronic and Paper Ballot Voting System includes precinct central processing unit application software 80 and operating system 82 for precinct central processing unit 71 comprised of program logic providing the process and means of operation of the present invention. P-CPU Software Block Diagram FIG. 14 and P-CPU Software Routine Functional Blocks FIG. 15 are flowcharts of P-CPU application software 80.

Description of P-CPU Software on FIGS. 14 and 15

P-CPU 71 operates with an operating system 82 (Block 14-12) that is designed specifically for the present invention to optimize system efficiency, reliability and security. P-CPU application software 80 (Block 14-13) consists of routines designed to perform specific functions pertaining to the set-up, test and operation of the present invention.

There are various outputs of precinct system set-up software routine. Election official performs physical set-up of voting system. (Block 14-5) Voting stations 70 are erected, power and communication cables connected, and P-CPU 71 set-up, much as a typical personal computer. (Block 15-1)

Upon power up, precinct system set-up software routine self-checks precinct system components, such as communication paths from voting stations to P-CPU 71, and that power levels are correct. If any component fails test, a message on the computer screen alerts an election official as to which component has failed, and suggests corrective action. If all components pass test, a message on the computer screen indicates that the system has passed all tests and prompts election official to generate a printout showing all components are correctly connected, powered, and functional. (Blocks 14-1, 14-4, and 15-2)

Election headquarters 40 provides predetermined ballot configuration set-up data to each precinct. After precinct system set-up and test, precinct system is ready for ballot configuration information for the present election. (Block 14-2)

Electronic ballot configuration files are transmitted from election headquarters 40 to each precinct 60 via a computer modem. When ballot configuration files are loaded into P-CPU 71, precinct system set-up routine directs election officials through voting station identification process. (Block 15-3 and FIG. 11)

Each voting station 70 is tested with a ballot sample 48 of each ballot configuration to confirm that precinct application software 80 has correct ballot information. (Block 15-4) After each voting station 70 is tested and each ballot style is confirmed as correct, the set-up routine records all test results and makes the data available for report printing and storage. (Block 15-5)

Vote Capture Routine of Application Software 80 on FIGS. 14 and 15

There are various outputs from vote capture routine of P-CPU application software 80. Voters using voting stations 70 mark ballots 34 and generate electronic data representative of their marks on ballot. (Blocks 14-3, 14-7 and 15-6)

As voter makes mark on ballot 34, vote capture routine facilitates receipt of vote data in the form of XY coordinate pairs generated by the electronics at voting station 70. (Blocks 14-6 and 15-7)

Received data are compared to values in a software lookup table. (Block 15-8) When received data match a value in lookup table, a vote is registered for the corresponding ballot choice. (Block 15-9) Vote capture routine uses vote data from each voter to recreate an electronic image of each voter mark on electronic ballot form contained in vote capture routine. Ballot images are stored on P-CPU 71 and on separate electronic media. (Block 15-10)

Vote data from all voting stations 70 is accumulated for use by vote tally routine. (Blocks 15-11 and 14-8)

Vote Tally Routine of Application Software 80 on FIGS. 14 and 15

There are various outputs of vote tally routine of P-CPU application software 80, including election results for precinct 60 for use by report and archiving routine. Data from each voting station 70 within precinct 60 is tallied. (Blocks 14-9 and 14-8) Vote tally routine obtains data from vote capture routine in order to total all votes cast. Accumulated vote data are used to determine which ballot choices have received the most votes for a particular contest. Accumulated vote totals are prepared for final election result reporting. (Blocks 15-12, 15-13 and 15-14)

Report Generation and Archiving Routine of Application Software 80 on FIGS. 14 and 15

There are various reports and files generated for reporting and archival purposes. Electronic and paper record of system activity from setup-test through final tally for precinct 60 is generated. Final election result report on paper and electronic format is generated for transmission to headquarters 40. Archival copies of all reports are stored on electronic storage media. Report generation and archiving routine uses data generated by the other software routines to record all system activity. (Blocks 14-10 and 14-11)

System set-up process generates set-up and test data used by report generation and archiving routine to create reports to be printed on paper and stored on electronic storage media for archival purposes. (Block 15-15)

Vote capture routine generates data recording all activity of each voting station from the time station power is applied until polls close. This data, such as the time each station is in use by voters, the time each station is idle, and the number of voters serviced by each station, are formatted for paper copy reports and storage on electronic storage media. (Block 15-16)

Vote tally data are formatted for reporting on both paper copies and electronic storage media. These reports show final election results for precinct and are forwarded to headquarters election. (Block 15-17)

A final precinct 60 activity summary is formatted and generated for paper copy reports 59 and storage on electronic storage media. (Block 15-18)

DESCRIPTION—FIGS. 3 AND 10—PREFERRED EMBODIMENT

Description of Reader Control Unit and Connections on FIGS. 3 and 10

Reader control unit 72 provides interface between electronic readers 61, and P-CPU 71.

P-CPU 71 is positioned within a precinct 60 at a location several feet from voting stations 70 (FIG. 3*a*), a placement providing flexibility in system set-up locations and a buffer zone between voting stations 70 and P-CPU 71. A single interface cable 36 allows reader control unit 72 to be placed several feet from P-CPU 71 in any direction. Communication cables 35 connect electronic readers 61 at each voting station 70 to Reader control unit 72. Up to thirty voting stations 70 can be connected to each reader control unit 72. Reader control units 72 are used as hub devices when expansion of system is required. In the preferred embodiment, thirty voting stations 70 are the recommended maximum to be controlled by one computer attendant using a P-CPU 71.

Reader Control Unit Block Diagram on FIG. 10

In the preferred embodiment, communication between electronic readers 61, reader control unit 72, and P-CPU 71 is accomplished via a full duplex connection. Control unit 72 passes data to P-CPU 71 via one interface cable 36. In the preferred embodiment, RS232 Interface 78 serial data transmission is used. Various other transmission methods, such as Universal Serial Bus, wireless or Ethernet connections, are possible.

Reader control unit 72 controls from one to thirty readers 61. Optical isolators 79 electrically isolate control unit 72 from reader 61 in both communication directions.

Reader control unit 72 backup batteries 84 are provided to automatically switch on if normal alternating current power is lost. Reader control unit charging circuitry 83 keeps batteries 84 charged while in normal operation and when system is in storage.

DESCRIPTION—FIG. 4—PREFERRED EMBODIMENT

Configured Paper Ballot—FIG. 4

Ballot 34 is configured to an overall dimension and shape as determined by system requirements. In the preferred embodiment, ballot 34 paper type is standard card stock. A ballot border 26 is one-quarter inch around entire ballot 34. All ballot races must be printed within border 26. Printing can be on one or two sides. A landscape format mode is recommended in the preferred embodiment, but format can be portrait mode. Races to be voted upon are identified with text contained within ballot measure text box 27.

Ballot measure heading 30 text for each ballot measure is no smaller than 12-point text size. Measure heading support text 29 for each measure heading 30 and supporting information text 104 associated with each choice is no smaller than 8-point text size. Ballot choice text 103 is no smaller than 10-point text.

Paper ballot 34 is configured to a predetermined size with a predetermined number of ballot measure headings 30 and ballot choice text boxes 102 as defined by election officials. In the preferred embodiment, ballot 34 is configured to have at least two ballot alignment holes 33 punched through the paper in precisely measured locations. Alignment hole 33 locations remain constant from one election to the next and are specified by design so that ballot 34 is compatible with location of alignment pegs 75 on reader 61 (See FIG. 9).

Ballot 34 is configured so that each possible ballot choice text box 102 on a ballot 34 has a choice mark box 32 next to the ballot choice text box 102 for a voter to mark. A mark inside choice mark box 32 indicates desire to vote for a candidate or a choice in corresponding ballot choice text box 102.

A write-in text box 105 is provided on ballot 34 under ballot measure heading 30 when write-in votes are allowed for a race. A voter writes a name in write-in text box 105 and places a mark in accompanying write-in mark box 106.

Ballot 34 is configured to include a cast ballot text box 100 and accompanying cast ballot mark box 101. Voter is instructed to place a mark inside cast ballot mark box 101 when finished voting to certify approval of ballot 34 as marked.

Ballot 34 is configured to include void ballot text box 98 and accompanying void ballot mark box 99 to allow voter to indicate choice to void ballot 34 and start over with a fresh ballot 34. When void ballot mark box 99 is marked, system electronics notifies a poll worker of desire of voter for a new ballot 34. Poll worker then performs ballot 34 nullification procedures to ensure voided Ballot 34 is not counted and is not kept with cast ballots.

Configuration identification number 25 is a model number allowing various ballot configurations in an election. Ballot 34 is configured so identification (ID) number 25 is printed on each ballot 34. ID number 25 is defined during ballot configuration routine performed by election official for each ballot configuration when ballots 34 are designed. When ballot 34 design is completed, ID number 25 is included in software ballot definition file for that ballot 34, linking software ballot definitions to particular paper ballot 34.

Each ballot 34 configuration has a ballot confirmation statement 97 and accompanying ballot confirmation mark box 96 that a voter uses to acknowledge the ballot configuration issued. Each voter places ballot 34 on reader writing surface 74 using ballot alignment holes 33 and alignment pegs 75 on reader 61. (See FIG. 9) Voter reads ballot confirmation statement 97, and if voter agrees with statement 97, voter marks accompanying ballot confirmation mark box 96. The mark location XY coordinates are compared in P-CPU application software 80 (See FIG. 14) to the coordinate range assigned for the particular ballot configuration. When values compare favorably, voter continues voting without interruption. When values disagree, an error message is displayed on the screen of P-CPU 71 (See FIG. 7) and election official investigates. When voter disagrees with ballot confirmation statement 97, voter notifies election official that a different ballot 34 is needed.

DESCRIPTION—FIGS. 8 and 9—PREFERRED EMBODIMENT

Description of Electronic Reader—FIG. 9

A preferred embodiment of the present invention includes an electronic reader 61 comprised of a rectangular shaped enclosure, an electronic reader housing 87 of sufficient size to accommodate configured paper ballot 34 on writing surface 74 and to enclose necessary electronics for reader 61 operation. Reader 61 is constructed to provide a favorable ergonomic position for reading and marking of ballot 34. Position and viewing angle of writing surface 74 is provided by a sloped top design. Other methods of providing a favorable slope, such as legs or bumpers under reader 61 can produce desired effect.

Electronic reader 61 has at least two alignment pegs 75 located on writing surface 74 of reader 61 used to properly position ballot 34 on reader 61. Pegs 75 fix location of ballot 34 for duration of voting activity of voter.

Electronic marking stylus 62 is similar in size and shape to a traditional writing instrument, with electronic components inside its housing. An electronic marking stylus inking tip 86 provides means for voter to mark ballot 34 utilizing a normal writing method used with a writing instrument such as a ballpoint pen. An electronic marking stylus connection cable 77 connects stylus 62 to reader 61 and provides power and drive signals to stylus 62.

Data from and to reader 61 are sent and received via communication cable 35. Indicator light 76 on electronic reader housing 87 indicates operational status of reader 61.

Voter places configured paper ballot 34 on writing surface 74 of electronic reader housing 87 using alignment pegs 75 to properly place ballot 34. Voter reads each ballot measure text box 27 that identifies measure to be voted on. Below ballot measure text box 27 are one or more ballot choice text boxes 102, each with a corresponding ballot choice mark box 32. Using electronic marking stylus 62 connected to reader 61 by electronic marking stylus connection cable 77 a voter ink mark 31 is made inside ballot choice mark box 32 next to preferred ballot choice text box 102.

In the preferred embodiment, an XY coordinate input device 89 (See FIG. 8.) is a magnetic induction digitizer inside electronics reader housing 87. The digitizer captures stylus 62 position on ballot 34 when voter uses stylus 62. Stylus 62 position on ballot 34 is electronically stored in reader 61 memory as XY coordinate pairs when ink mark 31 is made by voter. Contents of reader 61 memory are transferred to P-CPU 71 for further processing when reader 61 is polled by P-CPU 71. Ink mark 31 results from pressure applied to electronic marking stylus inking tip 86 within boundary of ballot choice mark box 32.

Write-in text box 105 and corresponding write-in mark box 106 are provided on ballot 34 for write-in votes. Voter writes or prints name as voter write-in text 28 within boundary of write-in text box 105, and places ink mark 31 in corresponding write-in mark box 106. Precinct application software 80 (FIG. 14) recognizes write-in vote and processes vote accordingly.

When voter is satisfied that all choices have been marked, voter places ink mark 31 inside cast ballot mark box 101 corresponding to cast ballot text box 100. When electronic marking stylus 62 touches cast ballot mark box 101, this action signals P-CPU application software 80 (FIG. 14) to disable reader 61 from accepting additional voter input until reader 61 is reset. When voter marks cast ballot mark box 101, reader 61 is automatically disabled and indicator light 76, which is a non-flashing light for duration of voter activity, begins flashing.

To void ballot 34, voter places ink mark 31 inside void ballot mark box 99 corresponding to void ballot text box 98. Voter ink mark 31 made inside void ballot mark box 99 signals P-CPU application software 80 (FIG. 14) to disable reader 61 and alerts poll worker to bring new ballot 34 to voter. When void ballot mark box 99 is marked, reader 61 is automatically disabled and indicator light 76 begins flashing.

Electronic Reader Stack-up and Cutaway—FIG. 8

XY coordinate input device 89, battery backup 92, and serial communication circuitry 94 (See FIG. 8*a*) is located inside electronic reader housing 87. When configured paper ballot 34 is placed on writing surface 74 using alignment pegs 75, ballot 34 is placed properly over XY coordinate input device 89. Indicator light 76 is visual indicator on reader 61 used by precinct workers to determine status of reader 61, that is, if it is ready for voter to begin or proceed with voting, or if there is a problem.

A locking mechanism 91 is located on access door 88 to reader housing 87. Access for service by authorized personnel is via access door 88.

DESCRIPTION—FIG. 8*a*—PREFERRED EMBODIMENT

Electronic Reader—FIG. 8*a*

In the preferred embodiment, XY coordinate input device 89 is a magnetic induction digitizer. Input device 89 uses a signal received from electronic marking stylus 62 to determine position of stylus 62 on paper ballot 34 (See FIG. 9) in relation to input device 89. Input device 89 is located inside reader housing 87 directly beneath ballot 34. Stylus 62 receives power and drive signals from input device 89 via stylus cable 77.

A reader power supply 69, such as a wall mount transformer, supplies power to reader 61. Reader power supply 69 connects directly to reader battery charging circuitry 93 to continuously charge battery backup 92. Battery backup 92 automatically engages to provide uninterrupted power to reader 61 if there is a general power outage.

A light emitting diode acts as reader indicator light 76. Light 76 communicates status of reader 61 by the condition of light 76. Light 76 has three modes of operation: Off, Flashing, and Continuous On. (See FIG. 7)

For each voter mark using stylus 62, XY coordinate device 89 inside reader housing 87 creates a string of X and Y coordinate values that map precise location on ballot 34 where mark is made. The electronics inside reader 61 compress and load data string into a first in/first out (FIFO) memory 95. When P-CPU 71 polls reader 61 for data, contents of FIFO memory 95 are sent to P-CPU 71 for processing.

In the preferred embodiment, serial communication circuitry 94 in reader 61 facilitates transfer of data between reader 61, reader control unit 72, and P-CPU 71. Communication cable 35 facilitates data transmission.

ALTERNATIVE EMBODIMENTS

Alternative embodiments to facilitate transfer of data between reader 61, reader control unit 72, and P-CPU 71 include other methods, such as parallel communications in reader 61.

Alternative embodiments of the present invention are that electronic reader 61 can have other shapes, and different dimensions. Reader 61 can present configured paper ballot 34 in various ways and in different languages. Reader 61 can be configured to provide access for visually impaired and mobility-impaired voters.

Alternative embodiments for data transmission are utilization of other modes of transferring data, such as wireless radio transmission.

Hub Architecture for System Expansion—FIG. 19

An additional embodiment of the present invention is hub architecture for system expansion. When over thirty voting stations 70 are needed, additional reader control units 72 are used as hub devices to allow a network of very large numbers of voting stations 70 to be connected to P-CPU 71. Interface cable 36 connects P-CPU 71 to first control unit 72 which controls up to thirty voting stations 70. Communication cable 35 connects each voting station 70 to first control unit 72. A second control unit 72 is connected to first control unit 72 via second interface cable 36. The second group of up to thirty voting stations 70 is connected to control unit 72 via communication cables 35.

An alternative embodiment of system expansion is use of an additional P-CPU I/O port 81 to provide connection to an additional reader control unit 72.

OPERATIONS

PRE-ELECTION ACTIVITIES—FIGS. 12*a* and 12*b*

Headquarters Operation Pre-election Activities—FIG. 12*a*

Several decisions and activities take place prior to an election regardless of voting system utilized. FIGS. **12*a* and 12*b* show various activities that take place at election headquarters 40 and at each precinct 60** and are further described in the following preferred embodiment of the present invention.

Election officials determine and confirm races and measures to be voted upon and choices available for each, number of precincts 60 to be open, number of voting stations 70 available at each precinct 60, and determine and confirm various ballot styles to be available at a given precinct 60. (Block **12*a*-1**)

Voting system components are set-up and tested using set-up and test software routine of H-CPU application software 50. If problems are encountered during test, software 50 will diagnose problem and suggest solutions to election officials via computer screen. Test results are printed and stored electronically. (Block **12*a*-2**)

Ballots 34 are designed using headquarters central processing unit 41 in conjunction with ballot configuration software routines of H-CPU application software 50. For any election, several different ballot styles can be required. Different ballot configurations are properly identified by a code that is a configuration identification number 25 (FIG. 4) printed on each ballot 34. (Block **12*a*-3**)

Each ballot 34 style is printed and tested at election headquarters 40. When ballot designer is satisfied all ballots are properly configured, electronic ballot set-up files 54 corresponding to each ballot configuration are created by ballot configuration software routine within H-CPU application software 50 and H-CPU 41. (Block **12*a*-4**)

Approved electronic files containing final ballot 34 formats are sent to approved commercial printer and to each precinct 60. (Block **12*a*-5**)

Finished ballots 34 from commercial printer are tested and inspected. (Block **12*a*-6**)

Approved ballot formats are printed in volume and are delivered to precincts 60 to be used in election. (Block **12*a*-7**)

Data from each precinct 60 are received via modem for testing of tally consolidation routine in H-CPU application software 50. (Block **12*a*-8) Facsimiled reports showing totals of test votes from each precinct 60 are received. (Block 12*b*-4 and 12*b*-5**)

Data generated from tally consolidation routine are compared to facsimiled copies from each precinct 60 to confirm all system components are operating properly. (Block **12*a*-9**)

Precinct Operation Pre-Election Activities—FIG. 12*b*

Several activities take place at precinct level prior to an election regardless of the voting system utilized, activities can include arranging for transportation of voting stations or booths, meeting with those responsible for voting site facility to arrange voting system set-up time, and coordination of activities of volunteers. FIG. **12*b* outlines the activities at precincts 60** in the days prior to Election Day.

Voting system hardware is moved from storage location to voting location prior to Election Day. Components are placed in desired physical locations in voting area, set-up, and tested. (Block 12b-1)

Voting station identification procedure is performed using set-up and test routine of P-CPU application software 80 (Block 12b-2 and FIG. 11).

Electronic ballot formats are received from H-CPU 41 via modem into P-CPU 71 for use in election. Electronic formats are checked to confirm correct ballot formats are received. Sample paper ballots 48 are used to test voting stations 70 in conjunction with electronic ballot formats to ensure system tallies and store votes correctly for each ballot style. (Blocks 12b-3 and 12b-4)

Test reports are generated electronically and sent via modem and facsimile 42 to headquarters 40 for tally consolidation testing. (Blocks 12b-5 and 12a-8)

ELECTION DAY OPERATIONS—FIGS. 13a and 13b

Headquarters Election Day Activities—FIG. 13a

In the preferred embodiment, Election Day activities at election headquarters 40 include functions as outlined on FIG. 13a.

Headquarters 40 voting system components are powered on and tested. Set-up and test software routine of H-CPU application software 50 tests each component. Election officials are notified via computer screen message of problems, and solutions are suggested by test routine of software 50 until all components are operational. (Block 13a-1)

Communication paths to each precinct 60 are tested to ensure smooth data transmission between each precinct 60 and headquarters 40. When all components are operational and tested, H-CPU 41 waits until polls close at each precinct 60 for receipt of election data from precincts 60. (Block 13a-2)

At poll closing time, H-CPU 41 receives data from each precinct 60 via computer modem. Data are organized in H-CPU application software 50 and stored in computer memory. Files containing data from each precinct 60 are stored. After all precincts 60 within headquarters 40 jurisdiction have transmitted their election data, tally consolidation routine within H-CPU application software 50 combines data and produces a final tally for each race. Software 50 maintains data from each precinct 60 separately and in a consolidated form in case an audit is needed. (Block 13a-3)

Each precinct 60 sends a paper copy of election results in summary form to headquarters 40 via a printer/facsimile 42. Officials at headquarters 40 compare facsimiled summary to electronic results received from each precinct 60 to ensure precinct 60 data have not been altered or corrupted. (Block 13a-4)

When facsimiled summary from each precinct 60 matches electronic data transmitted from precinct 60 via computer modem, and no challenges are presented to election officials, officials certify data as secure and data may be used for determining final election results. (Block 13a-5)

If for any reason a facsimiled summary does not match electronic data transmitted from precinct 60, election officials investigate the difference and determine need for an in-depth investigation. (Block 13a-6)

Paper ballots 34 are delivered from each precinct 60 in a secured container. Paper ballots 34 are available to audit individual precinct 60 results and are kept by headquarters 40 for long-term storage. (Block 13a-7)

When an election is challenged, or a recount is ordered, paper ballots 34 are counted by people in order to determine race winners. In the preferred embodiment, the first step of an audit or recount uses guidelines from Military Standard 105E or later, or a similar standard, to choose an appropriate sample size for paper ballots 34 which are then counted. The result of the count of the paper ballot sampling is compared to the electronic voting system results. Military Standard 105E provides flexibility for election officials to choose a sample size based on their needs. Sample counting will produce results that should statistically match election results produced by the electronic voting system of the present invention. Election results from the sample hand count of paper ballots 34 are analyzed and compared to election results produced by the electronic voting system. (Block 13a-8 and FIG. 18)

If variation between hand count of paper ballots 34 and electronically produced tallies are within tolerance, based on Military Standard 105E guidelines, election officials may choose to accept and certify electronic voting system results. (Sec 13a-9)

If a variation between hand count of paper ballots 34 and electronically produced tallies are outside acceptable tolerance, based on Military Standard 105E guidelines, election officials can choose to call for a one hundred percent hand count of all ballots 34 from all precincts 60, or a one hundred percent hand count of ballots 34 from any particular precinct 60 to resolve election results. (See 13a-10)

Precinct Election Day

Activities—FIG. 13b

Power up and test of system components is performed using set-up and test routine of P-CPU application software 80. A report showing startup test result is generated and sent to headquarters 40 as a test of the communication path between precinct 60 and headquarters 40 and to provide headquarters 40 with start-up test result for precinct 60 on Election Day. (Block 13b-1 and 13b-2)

After test completion, polls are ready to open. P-CPU 71 accepts data from voters via voting stations 70. (Block 13b-3 and FIG. 5)

At poll closing time, data gathered throughout Election Day are compiled and immediately sent via computer modem from P-CPU 71 directly to H-CPU 41. P-CPU 71 generates and prints a summary report showing precinct 60 election results. The summary report is facsimiled to headquarters 40 for comparison to electronic data sent from precinct 60. (Blocks 13b-4 and 2a-4)

All precinct 60 data are stored on P-CPU 71 hard drive and copied to electronic storage media for long-term archival purposes. One copy is made and sent to headquarters 40 and one copy is made and maintained at precinct 60. (Block 13b-5)

Paper ballots 34 marked by voters and placed in secured ballot deposit receptacle 66, are sealed and sent to headquarters 40 for use in auditing, if needed, and long-term storage. (Blocks 13b-6 and 13a-7)

VOTING STATION IDENTIFICATION PROCESS—FIG. 11

In the preferred embodiment, part of the set-up and test routine of P-CPU application software 80 includes a voting station identification sub-routine. This sub-routine associates individual voting stations 70 with an identification number. Vote capture routine in software 80 organizes and stores voting data received from each voting station 70. A voting station number corresponds to an individual voting station 70 beginning at Station 1 and continuing through the number of voting stations 70 required. Each voting station number is associated with a serial number on reader 61 that is permanently stored in a non-volatile memory of each reader 61. All system components are physically placed, powered on, and tested using set-up and test routine of P-CPU application software 80. (Block 11-1)

Election official operating P-CPU application software 80 and another election official operating individual voting stations 70 for this process confirm operation of all stations. (Block 11-2) One election official could perform both functions.

P-CPU attendant starts voting station identification subroutine of set-up and test routine within P-CPU application software 80. Software 80 guides identification process with computer screen prompts. (Block 11-3)

Voting station operator proceeds to first voting station 70 and places electronic marking stylus 62 perpendicular to writing surface 74 of reader 61 near center of reader 61. (Block 11-4)

P-CPU 71 attendant is prompted to send a REQUEST FOR ID command by pressing a key on the keyboard, or using a computer pointing device, such as a mouse, and choosing a screen-displayed icon. All commands and communication to and from readers 61 pass through reader control unit 72. (Block 11-5)

A command is sent to all voting stations 70 connected to P-CPU 71 via reader control unit 72. Only the reader 61 with electronic marking stylus 62 on reader writing surface 74 will respond by sending an internal, permanent number stored in non-volatile memory of readers 61. A reader number is assigned in the reader manufacturing process and is a serial number that cannot be changed or altered after it is in the memory of a reader 61. (Block 11-6)

A reader 61 number is sent back to P-CPU 71 via reader control unit 72. P-CPU 71 receives reader number and assigns number as “Voting Station 1” for election. This temporary association will be invalid when voting system is erected for next election. Voting station identification process is performed each time voting system is set-up. For the current election, a designation of Voting Station 1 is used by application software 80 to communicate status of Voting Station 1 to a P-CPU 71 attendant. (Block 11-7)

Identification process is repeated for each voting station 70 in a precinct 60 until each voting station 70 has a voting station number for present election. (Block 11-8)

Voting System General Operation—FIG. 6

Voter activities as shown on FIG. 6 and described below, are the preferred embodiment.

Electronic reader 61 is enabled before any voter uses an individual voting station 70. P-CPU 71 monitors voting station 70 activity and displays messages to P-CPU attendant concerning status of each reader 61 in each voting station 70. Reader 61 is enabled, by attendant monitoring P-CPU 71, using a keystroke combination or through pointing and clicking on a graphical representation of voting station 70 presented on P-CPU display. An indicator light 76 on reader 61 indicates to poll worker when voting station 70 is enabled and ready for use by voter. (Block 6-1)

After registration of voter is confirmed, poll worker issues voter ballot 34. Brief instructions are provided and voter is directed to an enabled voting station 70. (Block 6-2) Voter places ballot 34 onto writing surface 74 of reader 61. Alignment pegs 75 are provided on reader 61. Alignment holes 33 on ballot 34 are placed over pegs 75 so that ballot 34 lays flat and straight on writing surface 74 of reader 61 and movement during voting process is prevented. (Block 6-3)

Ballot 34 is pre-printed with several measures or contests be voted upon. Voter reviews each measure and places a mark next to preferred choice in choice mark box 32 provided next to each ballot choice text box 102. Voting system electronics and software work together to record each choice marked by electronic marking stylus 62. Each mark is recorded in the traditional manner of an ink mark left in a preferred choice mark box 102 for a given measure. An ink mark serves as proof of voter intent. The simultaneous capture of stylus 62 position on ballot 34, at the time mark is made, provides electronic data needed for vote tally process. (Block 6-4)

When voter has completed voting activity, voter must mark cast ballot mark box 101 on ballot 34. This final action signifies the intended end of voting activity of the particular voter and serves as proof the voter acknowledges acceptance of marks made on ballot 34. (Block 6-5)

Marking cast ballot mark box 101 sends signal to P-CPU 71 that voter is finished voting. P-CPU 71 sends back a signal that disables reader 61 from accepting additional votes from this voter. Additional marks made on ballot 34 after marking cast ballot mark box 101 cause an error message to be displayed on screen of P-CPU 71, alerting attendant that voter has made a mistake. A poll worker is dispatched to check on voting station 70. (Block 6-6)

When voter has marked cast ballot mark box 101 to indicate voting activity is completed, voter removes ballot 34 from reader 61 surface by lifting ballot 34 up and off alignment pegs 75. Voter exits voting station 70 with ballot 34 in hand. Reader 61 waits for a reset command from P-CPU 71 to enable reader 61 for next voter. (See 6-7)

A ballot deposit receptacle 66 is provided by precinct. Receptacle 66 is secure and opaque so marks on ballot 34 cannot be seen by anyone. Voter deposits ballot 34 into receptacle 66. At this point, voter has finished entire voting process and leaves voting area. (Blocks 6-8 and 6-9)

When voter marks cast ballot mark box 101 using stylus 62, reader 61 temporarily stores cast ballot mark XY coordinates until P-CPU 71 polls reader 61 for data. Cast ballot mark XY coordinates are the VOTER FINISHED signal that tells P-CPU 71, that reader 61 has all vote data from voter and is ready to send data to P-CPU 71 for processing. Data are received from reader 61 via reader control unit 72 indicating voter at voting station 70 is finished. When P-CPU 71 receives VOTER FINISHED signal from reader 61, P-CPU 71 returns a SEND DATA command to reader 61. (Blocks 6-10 and 6-11)

Software 80 in P-CPU 71 electronically reconstructs an image of each completed ballot 34, including marks on ballot 34 made by each voter. Storage is provided in memory of P-CPU 71 of ballot image of each voter along with images of all ballots 34 cast in an election. (Block 6-12)

After poll closing, P-CPU 71 performs vote tally function and prepares precinct 60 data for transfer to H-CPU 41 via modem. (Block 6-13)

P-CPU 71 and software 80 prepares paper report 59, a summary of precinct results, prints paper report 59, and prompts precinct 60 official to facsimile report 59 to election headquarters 40. Ballot deposit receptacle 66 is sealed and transported to headquarters 40. (Block 6-14)

Officials at election headquarters 40 compare facsimiled report 59 to electronically transmitted data to ensure and verify results match. Paper ballots 34 are used when an audit is required. (Block 6-15)

H-CPU application software 50 stores results in H-CPU 41 from all individual precincts 60 until all precincts 60 have reported final election results data. H-CPU 41 performs final tallying of all voter data from all precincts 60 within jurisdiction. (Blocks 6-16 and 6-17)

P-CPU 71 Monitor Display—FIG. 7

P-CPU monitor 68 displays messages needed for election officials to oversee electronic readers 61. When voter double votes or makes a mark in an incorrect area of ballot 34, P-CPU application software 80 sends a message via computer monitor 68 to alert P-CPU 71 attendant of the problem. (FIG. 7*a* and FIG. 7*b*) Attendant sends a poll worker to assist voter.

P-CPU monitor 68 displays four columns. Column 1, left-hand column, shows identification numbers of voting stations 70. Column 2 shows whether voting station 70 is Occupied (O) or Empty (E).

Column 3 shows one of five messages that notify attendant of a particular situation in voting station 70 with regard to reader 61 of voter, and if an action is required. (FIGS. 7, 7*a* and 7*b*)

READY indicates reader is standing by to be enabled for voter by attendant. Attendant enables reader.

VOTING indicates reader and voting station in use by voter. No action required.

ERROR indicates reader not responding to P-CPU 71 commands. Attendant notifies poll worker to check voting station to determine problem.

HELP indicates voter requires assistance. Attendant notifies poll worker to check relevant voting station to determine problem.

DOUBLE VOTE indicates voter inadvertently marks more than one choice in a measure or race that does not allow multiple choices. Attendant notifies poll worker to check voting station and when ballot 34 is spoiled directs voter to mark VOID and provides new ballot 34. Attendant proceeds according to procedure for spoiled ballots 34.

Column 4, right-hand column, indicates state of operation of electronic reader 61 through reader indicator light 76. Light 76 communicates visually to poll worker. When reader 61 is not functioning, or does not have power, light 76 is off. A flashing light 76 indicates reader 61 is ready for use but has not been enabled by attendant. Light 76 is solid when reader 61 is in use and operating properly. (FIGS. 7 and 7*a*)

Attendant controls flow of voters into voting stations 70, as voting stations 70 become available.

Electronic system counters within electronics of P-CPU 71 record number of voters having used each reader 61, time each reader 61 has been in READY mode with no activity taking place, and time each reader 61 has been in VOTING mode with a voter using the system. Several different electronic counters are used. Some counters are internal to reader 61 and not for display, some reader 61 counter data are sent to P-CPU 71 for tracking, and some counter data are displayed for use by election officials. (FIGS. 7, 7*a* and 7*b*)

Voting Process—FIG. 5

The preferred embodiment for the voting procedure from time voter arrives at polling place until voter finishes voting is shown on FIG. 5.

Voter brings registration information to polling place. If registration cannot be confirmed at this polling place, precinct election official contacts election headquarters 40 for investigation. (Blocks 5-1 through 5-4) If voter registration is confirmed, poll worker checks for available voting station 70. Voter waits until a voting station 70 is available. (Blocks 5-5 through 5-7) Voter receives paper ballot 34 as soon as a voting station 70 is available.

When ballot 34 is issued by poll worker, simple instructions regarding reader 61 and stylus 62 (Block 5-8) are provided to voter as follows.

1. Use only provided pen to mark ballot.
2. Place ballot on device in booth using alignment pegs as guide.
3. Mark only in the box next to the candidate or ballot issue. Any style of mark is permissible, including checkmark, X, diagonal slash, or round dot. Write-in votes must be written with provided pen.
4. When finished, mark "Cast Ballot" box.
5. If a mistake is made, mark "Void Ballot" box and a new ballot will be brought to the voting station.
6. Take completed ballot to the ballot receptacle and place in receptacle.

After receiving instructions, voter is shown to available voting station 70 by poll worker. Poll worker checks status of reader 61, if station is ready voter may proceed, if station is not ready, poll worker notifies P-CPU 71 attendant to reset voting station 70. Voter places ballot 34 on writing surface 74 of reader 61 using alignment pegs 75 to guide placement. (Block 5-9 through 5-12)

Voter reads ballot measure text box 27, then reads ballot choice text boxes 102 and makes choice appropriately in ballot choice mark box 32 using electronic marking stylus 62 to make ink marks. This step is repeated for each race on ballot 34. (Block 5-13)

When voter needs help or makes a mistake, voter contacts poll worker for help, or marks void ballot mark box 99 on ballot 34. A poll worker assists voter by answering questions or providing a new ballot 34 when needed. When voter marks void ballot mark box 99 choice, poll worker takes new ballot 34 to voter and performs procedure to ensure ballot 34 is not counted. (Block 5-14 through 5-18)

Voting station 70 is then reset from P-CPU 71 (Block 5-11), and voter starts over.

When voter question is addressed and it is determined a new ballot 34 is not required; voter continues voting process using original ballot 34.

When voter is satisfied ballot 34 is completed, voter must mark cast ballot mark box 101, remove ballot 34 from reader 61, and exit voting station 70. (See 5-19 through 5-21)

Voter inserts completed ballot 34 in secured ballot deposit receptacle 66. Voter exits polling place. (See 5-22 and 5-23)

Poll Closing and Post-Election Activities at Precinct and Headquarters FIGS. 17*a* and 17*b*

Precinct activities as poll closing time approaches for a particular election are shown on FIG. 17*a* and further described in the following preferred embodiment.

During the last few minutes of an election, as it becomes obvious to poll workers that a particular voting station 70 will not be needed again until the next election, electronic reader 61 in that voting station 70 is disabled. (Block 17*a*-1)

The last voter finishes voting process by marking cast ballot mark box 19, exiting voting station 70, and depositing marked ballot 34 in ballot deposit receptacle 66. (Block 17*a*-2)

Poll workers check to make certain all voting stations 70 are empty, and all electronic readers 61 are disabled, to ensure no additional vote data are sent from readers 61. (Block 17*a*-3)

Within seconds P-CPU 71 and vote tally software routine calculates election results. Vote tally software routine compiles all data, stores data electronically on P-CPU 71 hard drive, and automatically sends results data to H-CPU 41 via computer modem. (Block 17*a*-4)

Vote tally software routine prompts precinct official to make two copies of election results on portable electronic storage media. One copy remains at precinct 60 and one copy is sent to election headquarters 40. (Block 17*a*-5)

Vote tally software routine generates paper report 59, a summary of precinct results for printing on printer/facsimile 42. (Block 17*a*-6)

Printed report 59 is sent via printer/facsimile 42 to election headquarters 40 immediately after it is printed. (Block 17*a*-7)

Election officials seal ballot deposit receptacle 66 containing all cast ballots 34 from precinct 60. Receptacle 66 and one copy of precinct data previously copied onto portable electronic storage media (Block 17*a*-5) are transported to election headquarters 40. (Block 17*a*-8)

Precinct 60 is powered off, components dismantled, and system prepared for storage until next election. (Block 17*a*-9)

Headquarters Activities as Polls Close and Post-Election—FIG. 17*b*

Activities at election headquarters 40 as polls close and following an election are shown on FIG. 17*b* and further described in the following preferred embodiment.

Election officials at headquarters 40 confirm that the Combination Electronic and Paper Ballot Voting System is operational when polls opened. Throughout Election Day, officials at headquarters 40 perform normal Election Day duties, not necessarily related to present invention, and ensure voting system is ready when polls close. (Block 17*b*-1)

As precinct polls close, tally functions at each precinct 60 are performed on P-CPU 71. P-CPU 71 then contacts H-CPU 41 and automatically sends precinct election data via modem. (Block 17*b*-2)

Election officials at each precinct 60, within headquarters 40 jurisdiction, send summary of precinct results via facsimile 42. This printed report 59 is sent immediately after P-CPU 71 electronically sends files containing precinct 60 election data. (Block 17*b*-3)

Election officials at headquarters 40 compare electronically-received data results to facsimiled paper report 59 provided by precincts 60. The comparison ensures electronic data were not corrupted or altered during modem transmission. An investigation is instituted when facsimiled paper report 59 and electronic file data do not match exactly. (Block 17*b*-4)

Tally consolidation routine in H-CPU application software 50 gathers received data from all precincts 60 and combines data to produce consolidated tallies for entire jurisdiction. Consolidated totals are compared to sum of individual precinct tallies shown in precinct electronic files and on facsimiled paper report 59 received from each precinct 60. (Block 17*b*-5)

When election officials choose to audit all results, as part of their regular election certification process, or when results are challenged, election officials at headquarters 40 begin an audit process (Block 17*b*-6 and FIG. 18).

When no audit is required, or when audit is performed and results are confirmed as correct, election results can be certified as final. Paper ballots 34 and backup copies of electronic election data are received from all precincts 60, and prepared for audit or storage. (Block 17*b*-7)

Paper ballots 34 and backup copies of electronic election data from all precincts 60 are archived. Headquarters officials prepare components of Combination Electronic and Paper Ballot Voting System for storage. (Block 17*b*-8)

Election Result Audit Process—FIG. 18

Election result audit activities performed at discretion of election officials, or rules of a jurisdiction governing an election, are shown on FIG. 18 and further described in the following preferred embodiment.

Before an audit can begin, election headquarters 40 must receive all relevant election data from every precinct 60 within headquarters jurisdiction. Election data includes electronically transmitted election results from each precinct 60, facsimiled paper report 59 of summary of election result from each precinct 60, and paper ballots 34 from each precinct 60. (Block 18-1)

Vote tally consolidation routine within H-CPU application software 50 generates statistical data used in audit. Election results from each precinct 60 including winning choices and percentages of voters that chose each candidate are shown. Statistics showing combined results from all precincts 60 are generated. (Block 18-2)

A statistical sampling procedure, such as Military Standard 105E, or equivalent rules, is first step in a hand count audit of paper ballots 34. Military Standard 105E obtains desired level of certainty by providing several levels of sampling. Election officials or jurisdiction rules dictates required level of certainty for an election tally audit. Charts provided in Military Standard 105E suggest sample sizes to be counted by hand, based on total number of ballots 34 cast. (Block 18-3)

Election officials remove paper ballots 34 from sealed ballot deposit receptacles 66, based on sample size obtained through use of Military Standard 105E or jurisdiction rules. Ballots 34 from a particular precinct 60 can be audited. All ballots 34 cast in a headquarters 40 jurisdiction can be audited when mandated. Paper ballots 34 are removed at random from receptacles 66 for hand counting. (Block 18-4)

When only one race is to be audited, the hand count focuses only on that race. When all races are audited, the hand count must tally the choices made on sample ballots for each race and results recorded. Statistics, such as total number of ballots 34 sampled, percentage of total vote each choice received, and race winners based on the hand count, are calculated. (Block 18-5)

Results recorded in a hand count of sample ballots are analyzed and compared to statistical results from the Combination Electronic and Paper Ballot Voting System. Military Standard 105E provides acceptable tolerances for variation between sample results and results reported from the electronic voting system, based on total number of ballots 34 cast and sample size taken. (Block 18-6)

When statistics from sample size are within acceptable tolerances outlined in Military Standard 105E, or jurisdiction rules, election officials may conclude electronic election results are accurate and declare results as certified. (Blocks 18-7 and 18-8) When statistics are outside acceptable tolerances as outlined in Military Standard 105E, or jurisdiction rules, election officials may call for one hundred percent hand count of ballots for specific precincts or for entire jurisdiction. (Block 18-9)

When hand count of paper ballot 34 choices produce favorable results when compared to electronic voting system results, election officials can choose to certify electronic voting system results are accurate and declare the result final. (Block 18-8)

Ballot Style Detection Process—FIG. 20

The preferred embodiment for determining the style of a configured paper ballot 34 is shown on FIG. 20 and further described below.

Voter brings registration information to polling place where registration is checked. Based on registration information, voter is issued appropriate ballot style by election official. Ballot style is entered into P-CPU application software 80 by election official and voter is assigned to voting station 70. (Block 20-1)

Voter places paper ballot 34 on writing surface 74 of reader 61 using pre-punched ballot alignment holes 33 to guide ballot 34 over alignment pegs 75 on reader 61. Ballot confirmation statement 97 on ballot 34 describes ballot 34. Voter reads ballot confirmation statement 97 and to confirm that ballot 34 is correct style. (Block 20-2)

When voter believes correct ballot 34 has been provided, voter marks ballot confirmation mark box 96 accompanying ballot confirmation statement 97. XY coordinates of mark made by voter are sent to P-CPU 71 and compared to allowable values for ballot style and entered into P-CPU application software 80. (Block 20-3 and 20-5)

When coordinates of mark made by voter in ballot confirmation mark box 96 do not match allowable range for ballot style assigned to voting station 70, an error message is displayed on screen of P-CPU 71 alerting election official that voter either has wrong ballot 34 or has placed ballot 34 incorrectly on reader 61. When this occurs, an election official investigates. When coordinates of mark made in ballot confirmation mark box 96 match allowable range for ballot style assigned to voting station 70, an error message is not displayed on screen of P-CPU 71 and voter continues voting process without interruption. (Block 20-5 through 20-8)

P-CPU 71 continually monitors location of marks made on ballot 34. When marks are made outside allowable range for a ballot style entered into P-CPU application software 80 for use on voting station 70, an error message is displayed on P-CPU 71 screen and election official investigates reason for error by visiting voting station 70. When ballot formats are designed, attributes are assigned in software 80 to check voter is using ballot 34 correctly. Each ballot style uses distinct ranges of XY coordinate values for various races on ballot 34. Likewise, when a two-sided ballot 34 is utilized, software 80 monitors location of marks made on ballot 34 and alerts officials when an unexpected event occurs, such as when a voter marks only one side. When this occurs, an error message is displayed on screen of P-CPU 71, and election official investigates. (Block 20-9)

Voter continues to vote by marking choices in boxes provided next to each candidate name or ballot choice. When marks fall within expected ranges for ballot style assigned to voting station 70 for a particular voter, no error messages are displayed on P-CPU 71 screen. Voting process continues until voter marks cast ballot mark box 101. Reader 61 is disabled when box 101 is marked until being reset by election official for next voter. Reader 61 is configured for a ballot style to be used by each voter at the time reader 61 is reset. (Block 20-10)

Write-in Vote Process—FIG. 16

In the preferred embodiment, there is a process for write-in votes that is described below and shown on FIG. 16.

Pre-printed paper ballot 34 issued to each voter has a special box for voters to write-in a vote in races where write-in votes are allowed. Voters write their vote inside this write-in text box 105. (Block 16-1) When no write-in text box 105 is present for a particular race, write-in votes are not allowed in that race. (Blocks 16-2 and 16-3)

When write-in text box 105 is present and voter wishes to enter write-in vote, voter marks write-in mark box 106 next to write-in text box 105. Voter writes name of candidate within boundaries of write-in text box 105. Reader 61 electronically and temporarily stores pen strokes made by voter as a series of XY coordinates in memory. (Blocks 16-2 through 16-5).

P-CPU 71 polls reader 61 for data and when application software 80 finds write-in mark box 106 has been marked, P-CPU 71 and application software 80 asks reader 61 to send XY coordinate information, representing voter write-in text 28, to P-CPU 71. (Block 16-6)

Write-in data are stored in memory of P-CPU 71 and used by vote capture software routine of P-CPU application software 80 to recreate voter marks as part of electronic image of ballot 34. Write-in data are stored in a special electronic file for write-in votes by race for tallying. (Block 16-7)

When voter finishes voting, voter deposits paper ballot 34 in a ballot receptacle for write-in votes only, when provided to ease sorting, if write-in votes need to be reviewed. If such receptacle, for write-in votes only, is not provided, voter deposits ballot 34 in ballot deposit receptacle 66. (Block 16-8)

At the end of an election, write-in vote electronic files are used to tally write-in votes. Election officials review each write-in vote to determine how to count the vote. This may be accomplished by viewing images on screen of P-CPU 71 or by printing, by race, file containing write-in images. (Block 16-9)

Paper ballots 34 are retained for confirmation of race results, when required. (Block 16-10)

OPERATIONS—ALTERNATIVE EMBODIMENTS

An alternative embodiment of the present invention allows optical scanning when election officials in jurisdictions with optical scanners determine scanning should be done for yet another redundancy of vote tallies. Poll worker is stationed at scanner and observes voter inserting and removing ballot before placing it into ballot deposit receptacle.

CONCLUSION, RAMIFICATIONS, AND SCOPE

Accordingly, it can be seen that the Combination Electronic and Paper Ballot Voting System of this invention can be used to improve and facilitate the accuracy, speed, and reliability of paper ballot voting process. This combination of modem technology with the familiar paper ballots in a way that streamlines the voting process, automates result tabulation, and speeds up the entire voting process, eliminates technology apprehension and increases public acceptance and voter turnout. The paper ballot also provides an audit trail should there be a need to validate election results or to recount votes. The electronic reader, underneath the paper ballot and unseen by voter, records and stores voter choices, and eliminates the possibility of overvoting and reduces undervoting.

The Combination Electronic and Paper Ballot Voting System of the present invention benefits election officials at all levels of the process. It does not require a change to the existing voter registration or eligibility procedures. The election preparation is fast because the electronic readers are easy to set up and connect. The system and software are simple to test and to operate. The tallies are instantaneous and totals are available as soon as the last vote is cast. The system is lightweight and easy to transport. Storing and maintaining the rugged components of the system is easy and inexpensive. The system software is very user-friendly, allowing election officials to readily make adjustments for each new ballot and each type of election.

Although the description above contains many specificities, these should not be construed as limiting the scope of the invention, but as merely providing illustrations of some of the presently preferred embodiments of this invention. For example, the electronic reader can have other shapes, and different dimensions; and ability to present a ballot in various ways and in different languages. The electronic reader can be configured to provide access for visually-impaired, mobility-impaired, or literacy-challenged voters.

Thus, the scope of the invention should be determined by the appended claims and their legal equivalents, rather than by the examples given.

We claim:

1. A combination electronic and paper ballot voting system comprising:

one or more voting stations each having a ballot reader, each said ballot reader having:

a surface upon which a paper ballot is placed during voting, a sensing means associated with said surface, said sensing means capturing all marks as they are made by a voter on said paper ballot, a reader control unit that receives said sensed marks, and a first communication means;

a computer system operated by a precinct worker, said computer system having:

a second communication means in communication with said first communication means, a processing means, and a notification means, such that:

as marks are made on said paper ballot by said voter, said marks are continuously evaluated to determine whether the marks made by said voter up to that point in time constitute a valid voting pattern, whereby if the marks made by said voter up to that point in the voting process constitute an invalid voting pattern, said notification means immediately notifies said precinct worker of a voting problem.

2. The combination electronic and paper ballot voting system of claim 1, wherein said invalid voting pattern is the indication of more than one choice where only one choice is allowed.

3. The combination electronic and paper ballot voting system of claim 1, wherein said invalid voting pattern is a mark outside of an allowable range.

4. The combination electronic and paper ballot voting system of claim 1, wherein as marks are made on said paper ballot by said voter for a write-in vote, said marks are saved electronically exactly as marked by said voter and are available for electronic display or printout for the vote counting process.

5. The combination electronic and paper ballot voting system of claim 1, wherein said invalid voting pattern is a mark outside of a set of allowable regions on said ballot as dictated by a ballot style associated with an election and confirmed by said voter.

6. A combination electronic and paper ballot voting system comprising:

one or more voting stations each having a ballot reader, each said ballot reader having:

a surface upon which a paper ballot is placed during voting, a sensing means associated with said surface, said sensing means capturing all marks as they are made by a voter on said paper ballot, a reader control unit that receives said sensed marks, and a first communication means;

a computer system operated by a precinct worker, said computer system having:

a second communication means in communication with said first communication means, a processing means, and a notification means, such that:

as marks are made on said paper ballot by said voter, said marks are continuously evaluated to determine whether the marks made by said voter up to that point in time include a mark in a special area said ballot indicating a particular condition, whereby if said special area is marked, said precinct worker is immediately notified of said condition.

7. The combination electronic and paper ballot voting system of claim 6, wherein said condition is a desire by the voter to invalidate said ballot.

8. The combination electronic and paper ballot voting system of claim 6, wherein said condition is a desire by the voter to receive assistance from said precinct worker.

9. The combination electronic and paper ballot voting system of claim 6, wherein said condition is completion of voting, such that said precinct worker is further notified if an additional mark is made on said paper ballot after indication of completion is made.

10. A combination electronic and paper ballot voting system comprising:

one or more voting stations each having a ballot reader, each said ballot reader having:

a surface upon which a paper ballot is placed during voting, a sensing means associated with said surface, said sensing means capturing all marks as they are made by a voter on said paper ballot, a reader control unit that receives said sensed marks, and a first communication means;

a computer system operated by a precinct worker, said computer system having:

a second communication means in communication with said first communication means, a processing means, an elapsed time measurement system, and a notification means, such that:

said elapsed time measurement system determines if a predetermine amount of time has elapsed without a mark being made by said voter on the ballot, and if so, notifies said precinct worker of such via said notification means.

* * * * *